United States Patent
Altamura et al.

(10) Patent No.: US 12,480,414 B2
(45) Date of Patent: Nov. 25, 2025

(54) HUB ASSEMBLY HAVING A PITCH LOCK SYSTEM

(71) Applicant: GE Avio S.r.l., Rivalta di Torino (IT)

(72) Inventors: Paolo Altamura, Monopoli (IT); Giulio Zagato, Moncalieri (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/456,817

(22) Filed: Aug. 28, 2023

(65) Prior Publication Data
US 2024/0240566 A1 Jul. 18, 2024

(30) Foreign Application Priority Data
Jan. 13, 2023 (IT) .................. 102023000000423

(51) Int. Cl.
| | | |
|---|---|---|
| *F01D 7/00* | (2006.01) | |
| *B64C 11/06* | (2006.01) | |
| *B64C 11/38* | (2006.01) | |
| *B64C 11/40* | (2006.01) | |
| *F15B 15/02* | (2006.01) | |

(52) U.S. Cl.
CPC ................ *F01D 7/00* (2013.01); *B64C 11/06* (2013.01); *B64C 11/385* (2013.01); *B64C 11/40* (2013.01); *F15B 15/02* (2013.01); *F05D 2260/30* (2013.01)

(58) Field of Classification Search
CPC ......... F01D 7/00; B64C 11/06; B64C 11/385; B64C 11/40; B64C 11/44; F15B 15/02; F15B 15/262; F05D 2260/30
See application file for complete search history.

(56) References Cited

U.S. PATENT DOCUMENTS

| | | |
|---|---|---|
| 2,882,975 A * | 4/1959 | Hirsch .................. B64C 11/325 416/154 |
| 2,958,382 A | 11/1960 | Covert et al. |
| 3,893,789 A | 7/1975 | Andrews |
| 3,902,822 A | 9/1975 | Andrews et al. |
| 4,567,965 A | 2/1986 | Woodruff |
| 5,242,265 A | 9/1993 | Hora et al. |
| 5,391,055 A | 2/1995 | Carvalho |
| 5,836,743 A | 11/1998 | Carvalho et al. |
| 6,478,542 B1 | 11/2002 | Elliott |
| 8,083,482 B2 | 12/2011 | Serven et al. |
| 8,267,656 B2 | 9/2012 | Carvalho et al. |

(Continued)

FOREIGN PATENT DOCUMENTS

FR 3032423 B1 8/2016

*Primary Examiner* — Courtney D Heinle
*Assistant Examiner* — Jesse M Prager
(74) *Attorney, Agent, or Firm* — Venable LLP; Michele V. Frank

(57) ABSTRACT

A pitch lock system including an outer member having a centerline axis, an inner member located radially inward of the outer member with respect to the centerline axis, and a plurality of clutch elements located between the outer member and the inner member. The pitch lock system has a disengaged position and an engaged position. In the engaged position, the plurality of clutch elements are constrained between the inner member and the outer member such that relative axial direction of the plurality of clutch elements is permitted in only one direction. An engine includes a pitch actuator and the pitch lock system.

19 Claims, 15 Drawing Sheets

(56) References Cited

U.S. PATENT DOCUMENTS

| | | |
|---|---|---|
| 8,545,178 B2 | 10/2013 | Perkinson et al. |
| 9,120,559 B2 | 9/2015 | Danielson et al. |
| 9,381,997 B2 | 7/2016 | Perkinson |
| 10,533,436 B2 | 1/2020 | Niergarth et al. |
| 11,097,832 B2 | 8/2021 | Maver |
| 2007/0212221 A1 | 9/2007 | Carvalho et al. |
| 2011/0286845 A1 | 11/2011 | Perkinson |
| 2020/0324877 A1 | 10/2020 | Chahal et al. |

\* cited by examiner

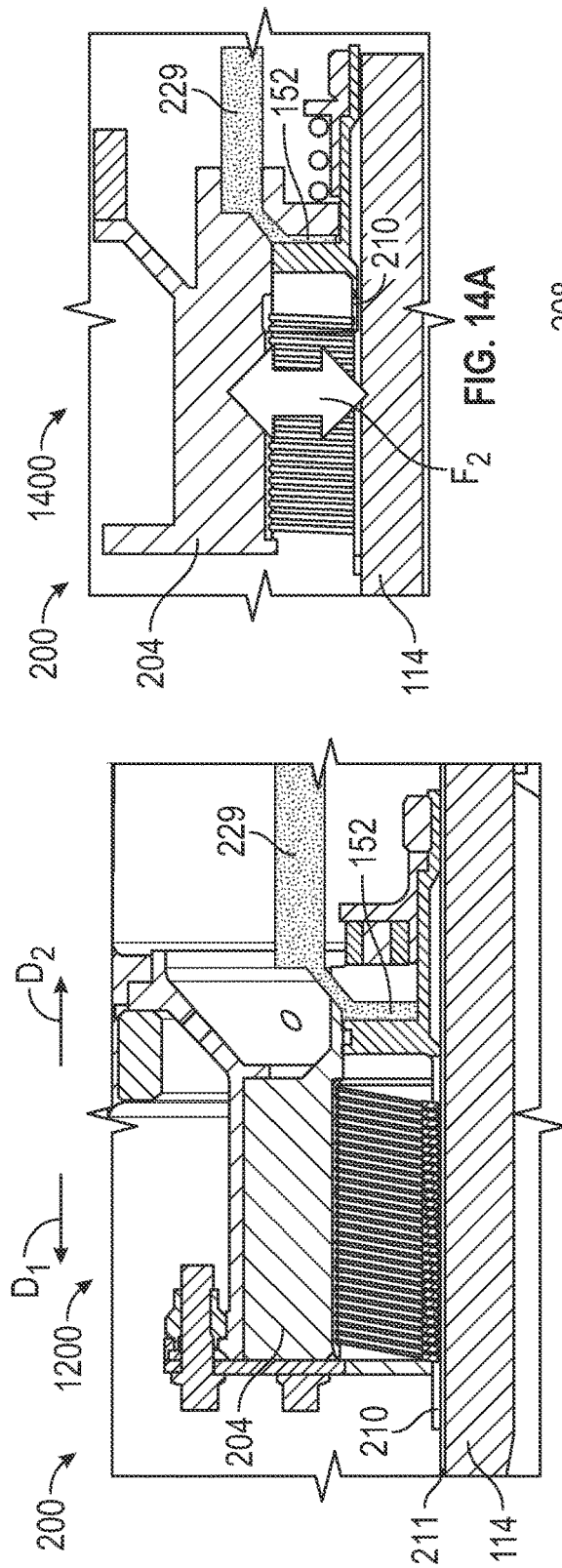
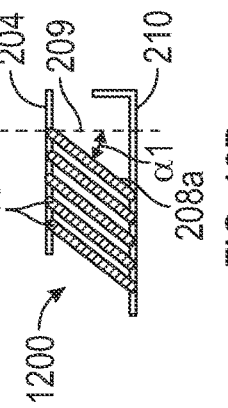
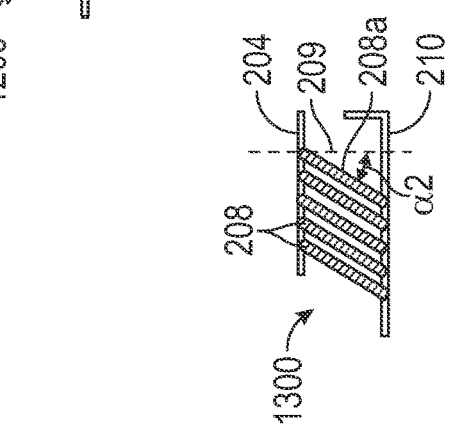
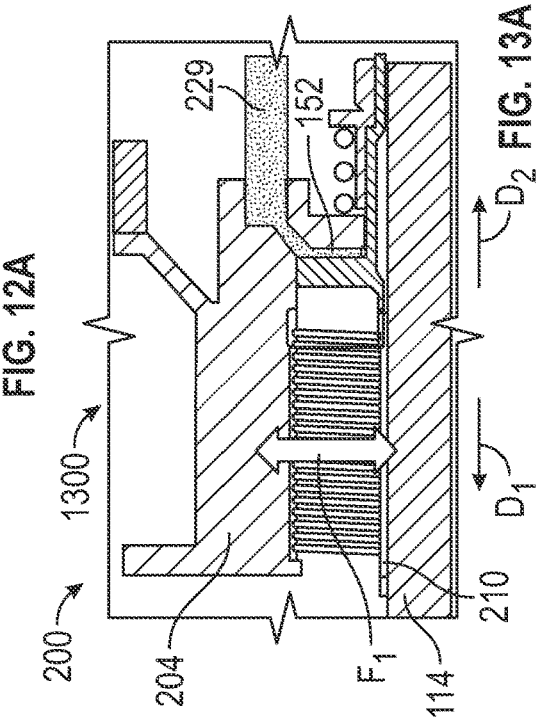
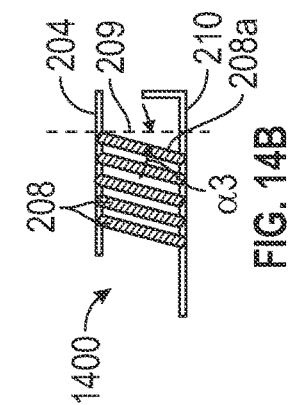

HUB ASSEMBLY HAVING A PITCH LOCK SYSTEM

CROSS REFERENCE TO RELATED APPLICATIONS

The present application claims the benefit of Italian patent application Ser. No. 102023000000423, filed on Jan. 13, 2023, which is hereby incorporated by reference herein in its entirety.

TECHNICAL FIELD

The present disclosure relates generally to a pitch lock system.

BACKGROUND

A turbine engine generally includes a fan and a core section arranged in flow communication with one another. The fan includes one or more blades.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 12A illustrates a schematic, cross-sectional view of the pitch lock system of FIG. 6 in a disengaged position, according to the present disclosure.

FIG. 12B illustrates a schematic view of the clutch plates in the disengaged position of FIG. 12A, according to the present disclosure.

FIG. 13A illustrates a schematic, cross-sectional view of the pitch lock system of FIG. 6 in a first engaged position, according to the present disclosure.

FIG. 13B illustrates a schematic view of the clutch plates in the first engaged position of FIG. 13A, according to the present disclosure.

FIG. 14A illustrates a schematic, cross-sectional view of the pitch lock system of FIG. 6 in a second engaged position, according to the present disclosure.

FIG. 14B illustrates a schematic view of the clutch plates in the second engaged position of FIG. 14A, according to the present disclosure.

DETAILED DESCRIPTION

Figure 1:
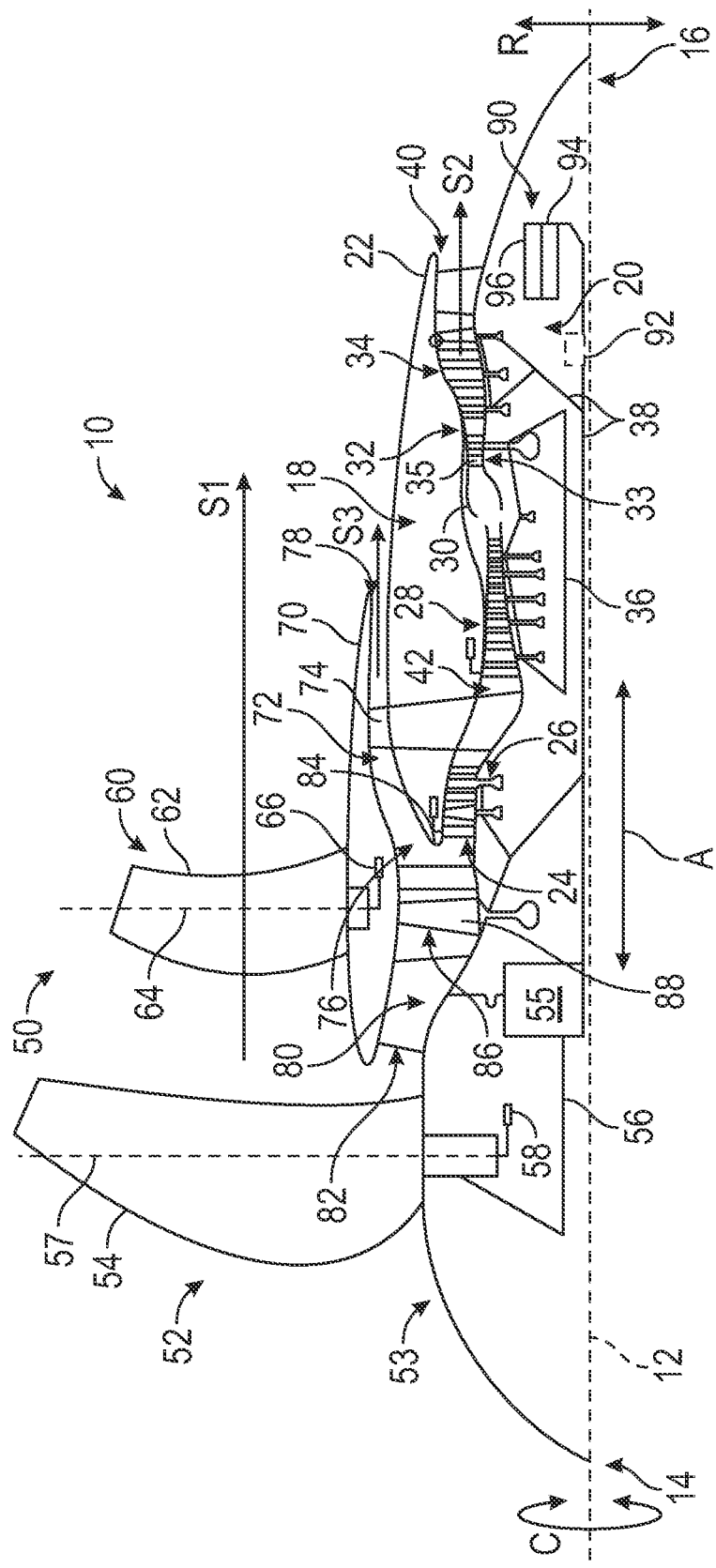
FIG. 1 illustrates a schematic view of an unducted, three-stream gas turbine engine, taken along a centerline axis of the engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Gas turbine engines include blades that have a variable pitch. The pitch may be tuned in coarse and fine directions with a pitch actuator. The pitch actuator may include crankshafts or trunnions coupled to a rack and pinion system. The pitch actuator is a hydraulic actuator. If there is a failure in the hydraulic system, the centrifugal twisting moment (CTM) of the blades will cause the pitch actuator and the blades to move to the fine direction. In order to prevent this condition, a pitch lock system will automatically lock the pitch actuator from moving to the fine direction when the failure (e.g., a loss of pressurization) in the hydraulic actuator occurs.

Accordingly, the present disclosure describes hub assemblies that effectuate pitch change of fan blades. The hub assemblies include two functional elements: a hydraulic linear actuator and a mechanical pitch lock system. The hydraulic linear actuator includes two chambers, a first chamber to actuate the coarse pitch and a second chamber to actuate the fine pitch. Functionally in parallel to the actuator, is a mechanical pitch lock system. The mechanical pitch lock system provides a linear one-way clutch. The pitch lock system of the present disclosure utilizes a follower-style pitch lock system that tracks with the axial stroke of the linear actuator.

In a first example, the pitch lock system of the present disclosure, via one or more clutch plates, transfers the propeller loads, from an inner shaft (coupled with an outer cylinder) to the outer cylinder (coupled with the piston) allowing the propeller to pitch lock when required. In such an arrangement, the clutch plates are locking between the inner shaft and the outer cylinder in one direction only (e.g., in the fine pitch direction). The engagement of the clutch elements is piloted by an "on/off switch" chamber. In normal operation, the on/off switch chamber is continuously pressurized, preventing the clutch plates to engage. If, and when, oil pressure drops, the preload provided by engagement springs push the clutch elements on the inner shaft, ultimately resulting in the blockage of relative axial motion of the inner and outer members toward the fine pitch.

In a second example, the pitch lock system of the present disclosure, via one or more roller elements, transfers the propeller loads, from an outer race (coupled with a cylinder) to an inner race (coupled with a piston) allowing the propeller to pitch lock. In such an arrangement the rolling elements are locking up between the inner race and the outer race in one direction only. The engagement of the rolling elements is piloted by an "on/off switch" chamber. In normal operation, the on/off switch chamber is continuously fed, preventing the clutch to engage. If, and when, oil pressure drops, the preload provided by engagement springs push the rolling elements on the inner race ramps in order to engage with the outer races, ultimately resulting in the blockage of relative axial motion of the inner and outer races toward the fine pitch.

FIG. 1 shows a schematic view of an unducted, three-stream, gas turbine engine 10 for an aircraft that may incorporate one or more embodiments of the present disclosure. The gas turbine engine 10 is a "three-stream engine" in that its architecture provides three distinct streams (labeled S1, S2, and S3) of thrust-producing airflow during operation, as detailed further below.

As shown in FIG. 1, the gas turbine engine 10 defines an axial direction A, a radial direction R, and a circumferential direction C. Moreover, the gas turbine engine 10 defines a centerline axis 12 that extends along the axial direction A. In general, the axial direction A extends parallel to the centerline axis 12, the radial direction R extends outward from, and inward to, the centerline axis 12 in a direction orthogonal to the axial direction A, and the circumferential direction C extends three hundred sixty degrees (360°) around the centerline axis 12. The gas turbine engine 10 extends between a forward end 14 and an aft end 16, e.g., along the axial direction A.

The gas turbine engine 10 includes a core engine 20 and a fan assembly 50 positioned upstream thereof. Generally, the core engine 20 includes, in serial flow order, a compressor section, a combustion section, a turbine section, and an exhaust section. Particularly, as shown in FIG. 1, the core engine 20 includes an engine core 18 and a core cowl 22 that annularly surrounds the core engine 20. The engine core 18 includes a high-pressure (HP) compressor 28, a combustor 30, and a high-pressure (HP) turbine 32. The core engine 20 and the core cowl 22 define a core inlet 24 having an annular shape. The core cowl 22 further encloses and supports a low-pressure (LP) compressor 26 (also referred to as a booster) for pressurizing the air that enters the core engine 20 through core inlet 24. The HP compressor 28 receives pressurized air from the LP compressor 26 and further increases the pressure of the air. The pressurized air flows downstream to the combustor 30 where fuel is injected into the pressurized air and ignited to raise the temperature and the energy level of the pressurized air, thereby generating combustion gases.

The combustion gases flow from the combustor 30 downstream to the HP turbine 32. The HP turbine 32 drives the HP compressor 28 through a first shaft, also referred to as a high-pressure (HP) shaft 36 (also referred to as a high-speed shaft). In this regard, the HP turbine 32 is drivingly coupled with the HP compressor 28. The combustion gases then flow to a power turbine or low-pressure (LP) turbine 34. The LP turbine 34 drives the LP compressor 26 and components of the fan assembly 50 through a second shaft, also referred to as a low-pressure (LP) shaft 38 (also referred to as a low-speed shaft). In this regard, the LP turbine 34 is drivingly coupled with the LP compressor 26 and components of the fan assembly 50. The low-speed shaft 38 is coaxial with the high-speed shaft 36 in the embodiment of FIG. 1. After driving each of the HP turbine 32 and the LP turbine 34, the combustion gases exit the engine core 18 through a core exhaust nozzle 40. The core engine 20 defines a core flowpath, also referred to as a core duct 42, that extends between the core inlet 24 and the core exhaust nozzle 40. The core duct 42 is an annular duct positioned generally inward of the core cowl 22 along the radial direction R.

The fan assembly 50 includes a primary fan 52. For the embodiment of FIG. 1, the primary fan 52 is an open rotor fan, also referred to as an unducted fan. However, in other embodiments, the primary fan 52 may be ducted, e.g., by a fan casing or a nacelle circumferentially surrounding the primary fan 52. The primary fan 52 includes an array of fan blades 54 (only one shown in FIG. 1). The fan blades 54 are rotatable about the centerline axis 12 via a fan shaft 56. As shown in FIG. 1, the fan shaft 56 is coupled with the low-speed shaft 38 via a speed reduction gearbox, also referred to as a gearbox assembly 55, e.g., in an indirect-drive configuration. The gearbox assembly 55 is shown schematically in FIG. 1. The gearbox assembly 55 includes a plurality of gears for adjusting the rotational speed of the fan shaft 56 and, thus, the primary fan 52 relative to the low-speed shaft 38 to a more efficient rotational fan speed. The fan gearbox assembly may have a gear ratio of 4:1 to 12:1, or 7:1 to 12:1, or 4:1 to 10:1, or 5:1 to 9:1, or 6:1 to 9:1, and may be configured in an epicyclic star or planet gear configuration. The gearbox may be a single stage or compound gearbox.

The fan blades 54 can be arranged in equal spacing around the centerline axis 12. Each fan blade 54 has a root and a tip, and a span defined therebetween. Each fan blade 54 defines a central blade axis 57. For the embodiment of FIG. 1, each fan blade 54 of the primary fan 52 is rotatable about their respective central blade axis 57, e.g., in unison with one another. One or more actuators 58 are controlled to pitch the fan blades 54 about their respective central blade axis 57. In other embodiments, each fan blade 54 is fixed or is unable to be pitched about the central blade axis 57.

The fan assembly 50 further includes a fan guide vane array 60 that includes fan guide vanes 62 (only one shown in FIG. 1) disposed around the centerline axis 12. For the embodiment of FIG. 1, the fan guide vanes 62 are not rotatable about the centerline axis 12. Each fan guide vane 62 has a root and a tip, and a span defined therebetween. The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about their respective central vane axis 64, e.g., in unison with one another. One or more actuators 66 are controlled to pitch the fan guide vanes 62 about their respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters through a fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the centerline axis 12. The plurality of struts 74 are each aerodynamically contoured to direct air flowing thereby. Other struts in addition to the plurality of struts 74 can be used to connect and support the fan cowl 70 and/or the core cowl 22.

The gas turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 84 of the core cowl 22. The inlet duct 80 is wider than the core duct 42 along the radial direction R. The inlet duct 80 is also wider than the fan duct 72 along the radial direction R.

The fan assembly 50 also includes a mid-fan 86. The mid-fan 86 includes a plurality of mid-fan blades 88 (only one shown in FIG. 1). The plurality of mid-fan blades 88 are rotatable, e.g., about the centerline axis 12. The mid-fan 86 is drivingly coupled with the LP turbine 34 via the low-speed shaft 38. The plurality of mid-fan blades 88 can be arranged in equal circumferential spacing about the centerline axis 12. The plurality of mid-fan blades 88 are annularly surrounded (e.g., ducted) by the fan cowl 70. In this regard, the mid-fan 86 is positioned inward of the fan cowl 70 along the radial direction R. The mid-fan 86 is positioned within the inlet duct 80 upstream of both the core duct 42 and the fan duct 72. A ratio of a span of a fan blade 54 to that of a mid-fan blade 88 (a span is measured from a root to tip of the respective blade) is greater than two and less than ten, to achieve the desired benefits of the third stream S3, particularly the additional thrust the ratio offers to the gas turbine engine 10, which may enable a smaller diameter fan blade 54, which in turn, can benefit engine installation.

Accordingly, air flowing through the inlet duct 80 flows across the plurality of mid-fan blades 88 and is accelerated downstream thereof. At least a portion of the air accelerated by the mid-fan blades 88 flows into the fan duct 72 and is ultimately exhausted through the fan exhaust nozzle 78 to produce propulsive thrust. Also, at least a portion of the air accelerated by the plurality of mid-fan blades 88 flows into the core duct 42 and is ultimately exhausted through the core exhaust nozzle 40 to produce propulsive thrust. Generally, the mid-fan 86 is a compression device positioned downstream of the engine inlet 82. The mid-fan 86 is operable to accelerate air into the fan duct 72, also referred to as a secondary bypass passage.

During operation of the gas turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or first thrust stream S1. A majority of the net thrust produced by the gas turbine engine 10 is produced by the first thrust stream S1. The second airflow enters the inlet duct 80 through the engine inlet 82.

The second airflow flowing downstream through the inlet duct 80 flows through the plurality of mid-fan blades 88 of the mid-fan 86 and is consequently compressed. The second airflow flowing downstream of the mid-fan blades 88 is split by the splitter 84 located at the forward end of the core cowl 22. Particularly, a portion of the second airflow flowing downstream of the mid-fan 86 flows into the core duct 42 through the core inlet 24. The portion of the second airflow that flows into the core duct 42 is progressively compressed by the LP compressor 26 and the HP compressor 28, and is ultimately discharged into the combustion section. The discharged pressurized air stream flows downstream to the combustor 30 where fuel is introduced to generate combustion gases or products.

The combustor 30 defines an annular combustion chamber that is generally coaxial with the centerline axis 12. The combustor 30 receives pressurized air from the HP compressor 28 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 32. The first stage turbine nozzle 33 is defined by an annular flow channel that includes a plurality of radially extending, circumferentially spaced nozzle vanes 35 that turn the combustion gases so that the combustion gases flow angularly and impinge upon first stage turbine blades of the HP turbine 32. The combustion gases exit the HP turbine 32 and flow through the LP turbine 34, and exit the core duct 42 through the core exhaust nozzle 40 to produce a core air stream, also referred to as a second thrust stream S2. As noted above, the HP turbine 32 drives the HP compressor 28 via the high-speed shaft 36, and the LP turbine 34 drives the LP compressor 26, the primary fan 52, and the mid-fan 86, via the low-speed shaft 38.

The other portion of the second airflow flowing downstream of the mid-fan 86 is split by the splitter 84 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 10 depicted in FIG. 1 is by way of example only. In other embodiments, the gas turbine engine 10 may have any other suitable configuration. For example, in other embodiments, the primary fan 52 may be configured in any other suitable manner (e.g., as a fixed pitch fan) and further may be supported using any other suitable fan frame configuration. In other embodiments, the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Further, for the depicted embodiment of FIG. 1, the gas turbine engine 10 includes an electric machine 90, which may be a motor-generator, operably coupled with a rotating component thereof. In this regard, the gas turbine engine 10 is a hybrid-electric propulsion machine. Particularly, as shown in FIG. 1, the electric machine 90 is operatively coupled with the low-speed shaft 38. The electric machine 90 can be mechanically connected to the low-speed shaft 38, either directly, or indirectly, e.g., by way of a gearbox assembly 92 (shown schematically in FIG. 1). Further, although in this embodiment the electric machine 90 is operatively coupled with the low-speed shaft 38 at an aft end of the low-speed shaft 38, the electric machine 90 can be coupled with the low-speed shaft 38 at any suitable location or can be coupled to other rotating components of the gas turbine engine 10, such as the high-speed shaft 36 or the low-speed shaft 38. For instance, in some embodiments, the electric machine 90 can be coupled with the low-speed shaft 38 and positioned forward of the mid-fan 86 along the axial direction.

In some embodiments, the electric machine 90 can be an electric motor operable to drive or to motor the low-speed shaft 38, e.g., during an engine burst. In other embodiments, the electric machine 90 can be an electric generator operable to convert mechanical energy into electrical energy. In this way, electrical power generated by the electric machine 90 can be directed to various engine and/or aircraft systems. In some embodiments, the electric machine 90 can be a motor/generator with dual functionality. The electric machine 90 includes a rotor 94 and a stator 96. The rotor 94 is coupled to the low-speed shaft 38 and rotates with rotation of the low-speed shaft 38. In this way, the rotor 94 rotates with respect to the stator 96, thereby generating electrical power. Although the electric machine 90 has been described and illustrated in FIG. 1 as having a particular configuration, the present disclosure may apply to electric machines having alternative configurations. For instance, the rotor 94 and/or the stator 96 may have different configurations or may be arranged in a different manner than illustrated in FIG. 1.

Figure 2:
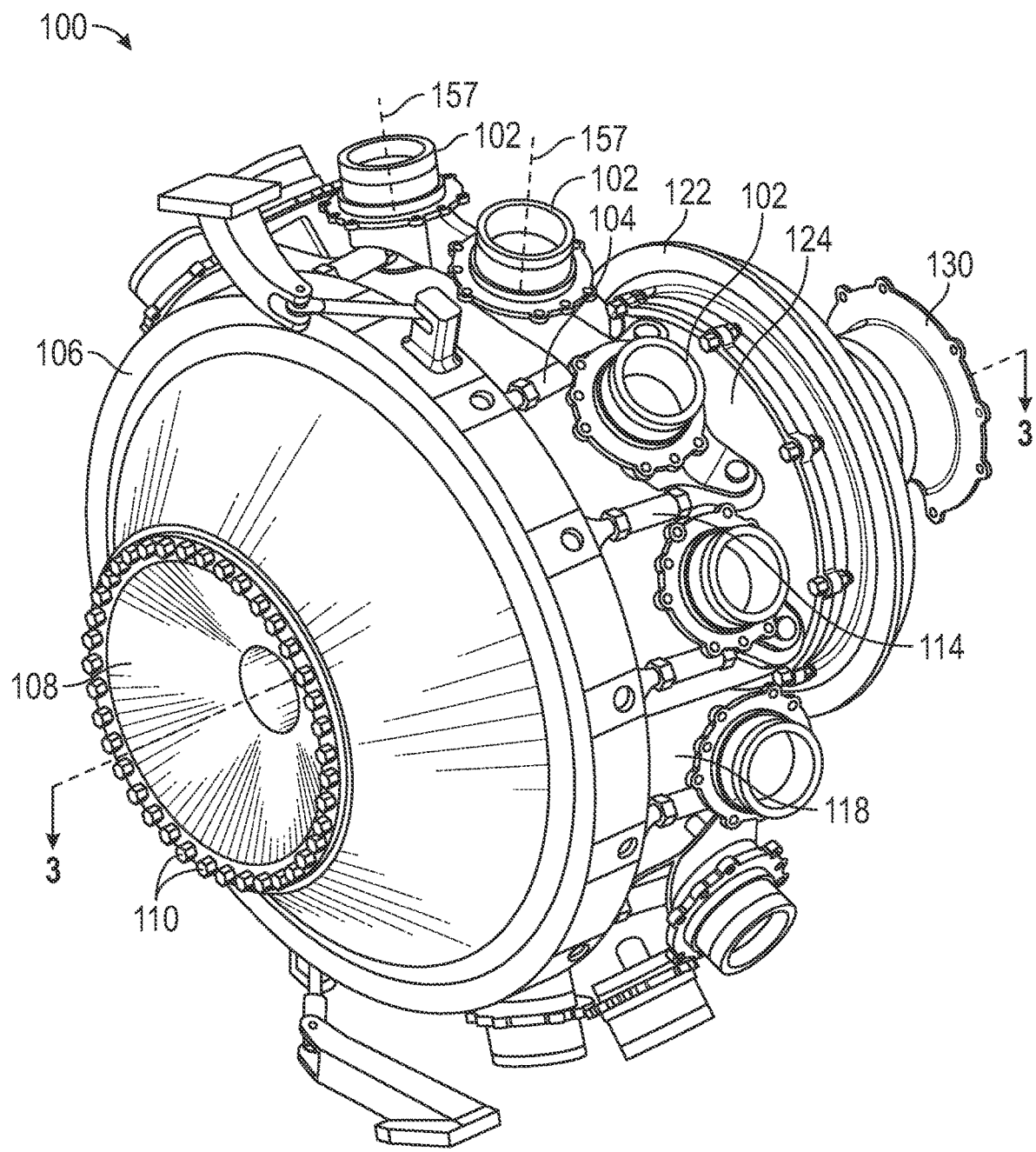
FIG. 2 illustrates a schematic perspective view of a hub assembly, according to the present disclosure.

FIG. 2 illustrates a perspective view of a hub assembly 100 that may be used in the gas turbine engine 10. That is, the hub assembly 100 may be used in place of the hub assembly 53 shown in FIG. 1 to control the pitch of the fan blades 54 shown in FIG. 1.

Figure 3:
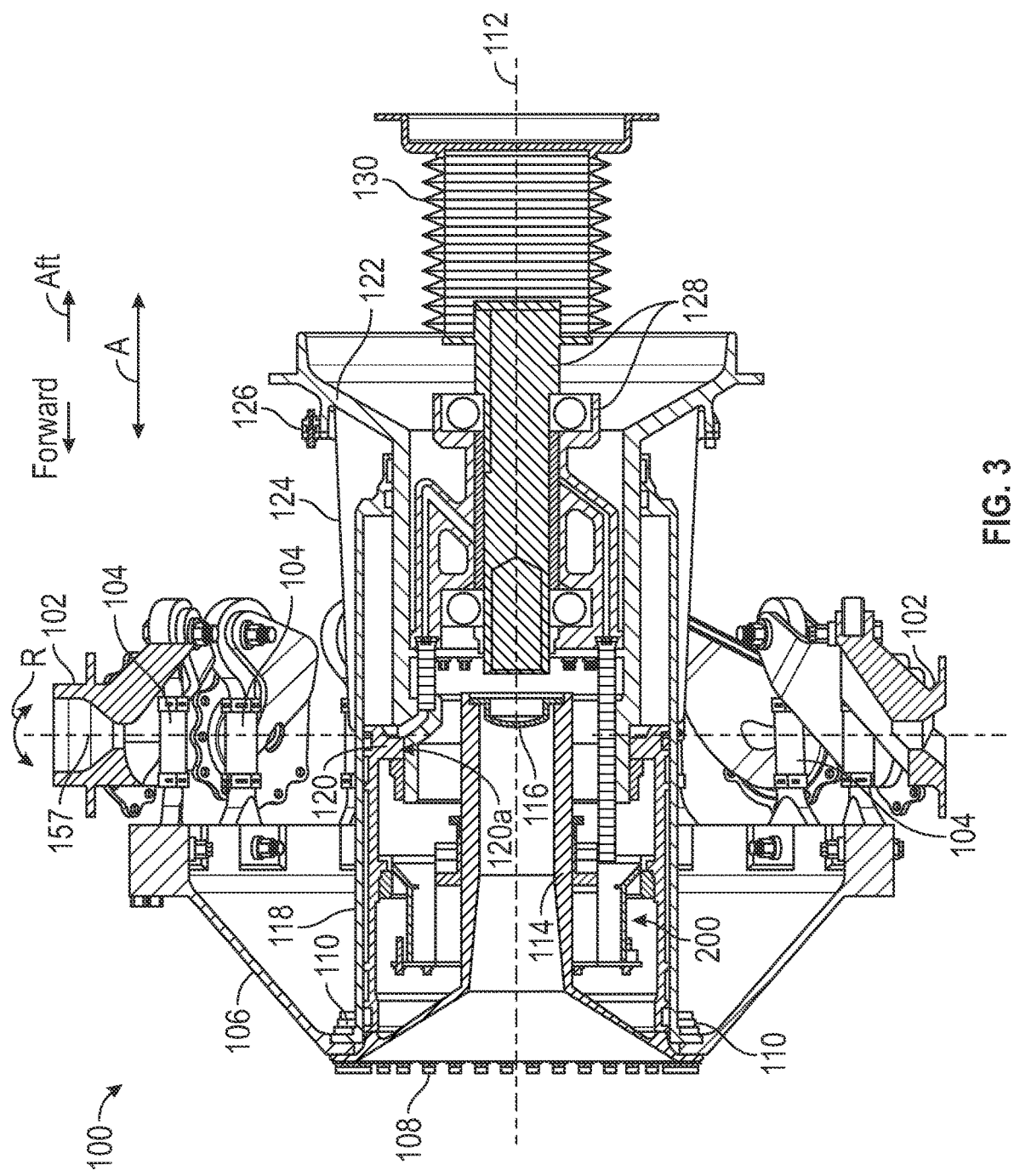
FIG. 3 illustrates a schematic, cross-sectional view of the hub assembly of FIG. 2 in a first position, taken along an axis 3-3 in FIG. 2, according to the present disclosure.
Figure 4:
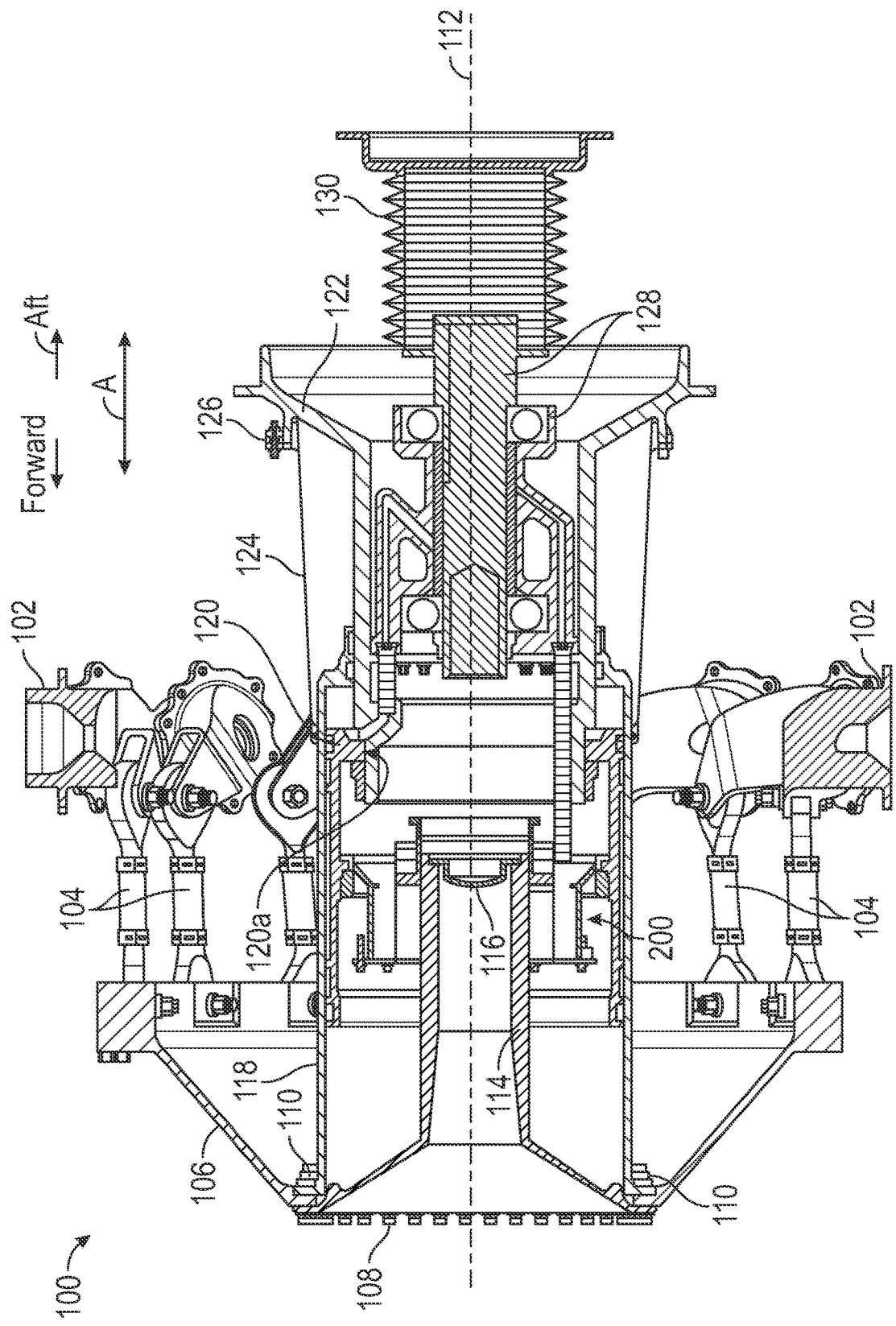
FIG. 4 illustrates a schematic, cross-sectional view of the hub assembly of FIG. 3 in a second position, according to the present disclosure.

FIG. 3 illustrates a cross-sectional view of the hub assembly 100 taken along the axis 3-3 in FIG. 2, in a first position. FIG. 4 illustrates a cross-sectional view of the hub assembly 100 of FIG. 3 in second position.

Referring to FIGS. 2 to 4, the hub assembly 100 includes a plurality of crankshafts 102 for coupling to a respective blade (omitted from FIGS. 2 to 4 for clarity, although this may be the fan blade 54 of FIG. 1). Each crankshaft 102 is coupled by a link 104 to a unison ring 106. In operation, as will be described in more detail to follow, movement of the unison ring 106 in the axial direction A along the centerline axis 112 moves the plurality of links 104 in the axial direction A to rotate each of the crankshafts 102 in a direction R about a central blade axis 157 of each blade.

With continued reference to FIGS. 2 to 4, the hub assembly 100 includes an inner shaft assembly 108 coupled to the unison ring 106. Although shown coupled with bolts 110, other connections are contemplated, including a unitary construction with the unison ring 106. The inner shaft assembly 108 includes an inner shaft 114 and a plug 116. Also coupled to the unison ring 106 with bolts 110 is a cylinder 118. The cylinder extends circumferentially around, with respect to the centerline axis 112, an outer surface of a piston 120 and an outer surface of the inner shaft 114. A pitch lock system 200 is provided radially inward of the piston 120. A piston rod 122 is coupled to the piston 120 at an aft end 120a of the piston 120. An oil sleeve 124 is located circumferentially around an outer surface of the piston rod 122 and is coupled at couplings 126 to the piston rod 122. Located within the piston rod 122 is an oil transfer bearing 128 coupled to an oil transfer bearing flexible connection 130.

Figure 5:
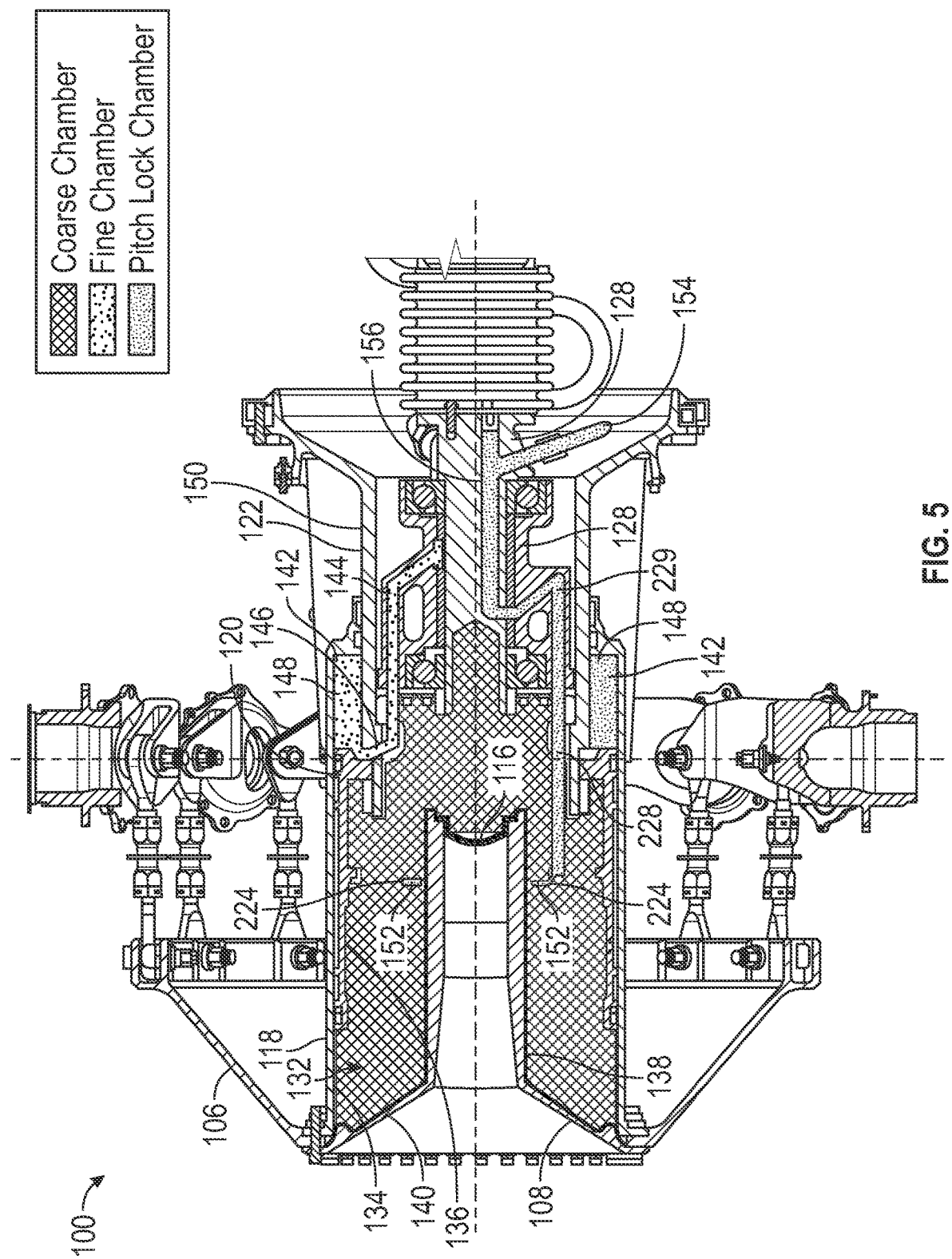
FIG. 5 illustrates a schematic, cross-sectional view of the hub assembly of FIG. 3 with fluid illustrated in chambers of the hub assembly, according to the present disclosure.

Referring briefly to FIG. 5, the hub assembly 100 forms a number of chambers to allow control of the pitch of the blades (e.g., the fan blades 54 in FIG. 1). A first chamber 132 is formed between (1) a radially inner surface 134 of the cylinder 118 and a radially inner surface 136 of the piston 120 and (2) a radially outer surface 138 of the inner shaft assembly 108. The plug 116 and a conical surface 140 of the radially outer surface 138 provide a forward end of the first chamber 132. An axially forward end of the oil transfer bearing 128 provides an aft end of the first chamber 132. As will be described in more detail to follow, the size of the first chamber 132 may change during operation of the hub assembly 100 to control the pitch of the blade. The first chamber 132 is also referred to herein as a coarse chamber 132 or a feather chamber 132.

A second chamber 142 is formed by a space 148 between the radially inner surface 134 of the cylinder 118 and a radially outer surface 150 of the piston rod 122. The space 148 is fluidly coupled to the oil transfer bearing flexible connection 130 by a passage 144 through the oil transfer bearing 128 and a passage 146 through the piston rod 122. As will be described in more detail to follow, the size of the second chamber 142 may change during operation of the hub assembly 100 to control the pitch of the blade. The second chamber 142 is also referred to as a fine chamber 142.

A third chamber 152 is formed by a space 224 in the pitch lock system 200. The space 224 is fluidly coupled to a fluid source with a first conduit 154, a passage 156 in the oil transfer bearing 128 (the passage 156 is fluidly separate from the passage 144), a conduit 228, and a passage 226 (FIG. 6) in the pitch lock system 200. As will be described in more detail to follow, the size of the third chamber 152 may change during operation of the pitch lock system 200. The third chamber 152 is also referred to as an on/off switch chamber 152.

Referring back to FIGS. 2 and 3, the hub assembly 100 is controlled to alter a pitch of a blade (e.g., the fan blade 54 of FIG. 1) about the central blade axis 157 (e.g., the central blade axis 57 of FIG. 1). During operation, fluid may be supplied to or removed from either the first chamber 132 or the second chamber 142 to affect movement in the axial direction A. For example, when fluid is supplied to the first chamber 132, the cylinder 118, the inner shaft assembly 108, and the unison ring 106 move in the forward direction along the axial direction A relative to the piston rod 122 and the piston 120. This movement causes movement of the links 104 in the forward direction. The links 104 are coupled to the crankshafts 102 such that axial movement of the links 104 causes rotational movement of the crankshafts 102. Thus, when the links 104 move in the forward direction, the crankshafts 102 rotate in the direction R such that the blades have a coarse pitch. When fluid is supplied to the second chamber 142, the cylinder 118, the inner shaft assembly 108, and the unison ring 106 move in the aft direction along the axial direction A relative to the piston rod 122 and the piston 120. This movement causes movement of the links 104 in the aft direction. When the links 104 move in the aft direction, the crankshafts 102 rotate in the direction R (opposite to the direction of rotation when the links 104 are moved in a forward direction) such that the blades have a fine pitch.

The position of FIG. 3 illustrates a fine pitch (as compared to FIG. 4). That is, the cylinder 118, the inner shaft assembly 108, and the unison ring 106 have moved aft to the piston rod 122 and the piston 120. Accordingly, the position of FIG. 4 illustrates a coarse pitch (as compared to FIG. 3). That is, the cylinder 118, the inner shaft assembly 108, and the unison ring 106 have moved forward to the piston rod 122 and the piston 120. The hub assembly 100 is formed in a manner that allows the transition from coarse to fine to be repeatable multiple times. Through this system, a predetermined pitch, or a desired pitch of the blades may be achieved through control of the fluid to the first chamber 132 and the second chamber 142. The aforementioned assembly is also referred to herein as a pitch actuator as this is the system that effectuates change of the pitch of the fan blades.

Accordingly, the oil transfer bearing flexible connection 130 and the oil transfer bearing flexible connection 130 are static both axially and rotationally. That is, there is no axial or rotational movement with respect to the engine frame. The oil sleeve 124, the piston rod 122, and the piston 120 are static axially, but may rotate. That is, there is no axial movement with respect to the engine frame, but there may be rotational movement with respect to the engine frame. In operation to adjust the pitch of the blades, the unison ring 106, the inner shaft assembly 108 (and, thus, also the inner shaft 114 and the plug 116), and the cylinder 118 move relative to the static features to move the links 104 and to rotate the crankshafts 102.

Due to the CTM of the blades acting on the central blade axis 157, the hub assembly 100 tends to pull to the fine position of FIG. 3. That is, the moment caused by the weight of the blades acts toward the aft direction to move the cylinder 118, the inner shaft assembly 108, and the unison ring 106 toward the aft direction. Thus, if there is a failure in the hydraulic system (e.g., loss of hydraulic pressure to the pitch actuator), the blades will move to the fine position. Such movement to the fine position is not desirable because this increases the drag on the engine. In order to prevent this undesired movement to the fine position, a pitch lock system 200 is provided. The pitch lock system 200 automatically activates when a hydraulic failure occurs in the pitch actuator to prevent the blades from moving more toward the fine position shown in FIG. 3 than the position of the blade when the hydraulic failure occurs. The pitch lock system 200 is illustrated simplistically in FIGS. 2 and 3 for clarity, and is shown and described in more detail when referring to FIGS. 6 to 14B.

Figure 6:
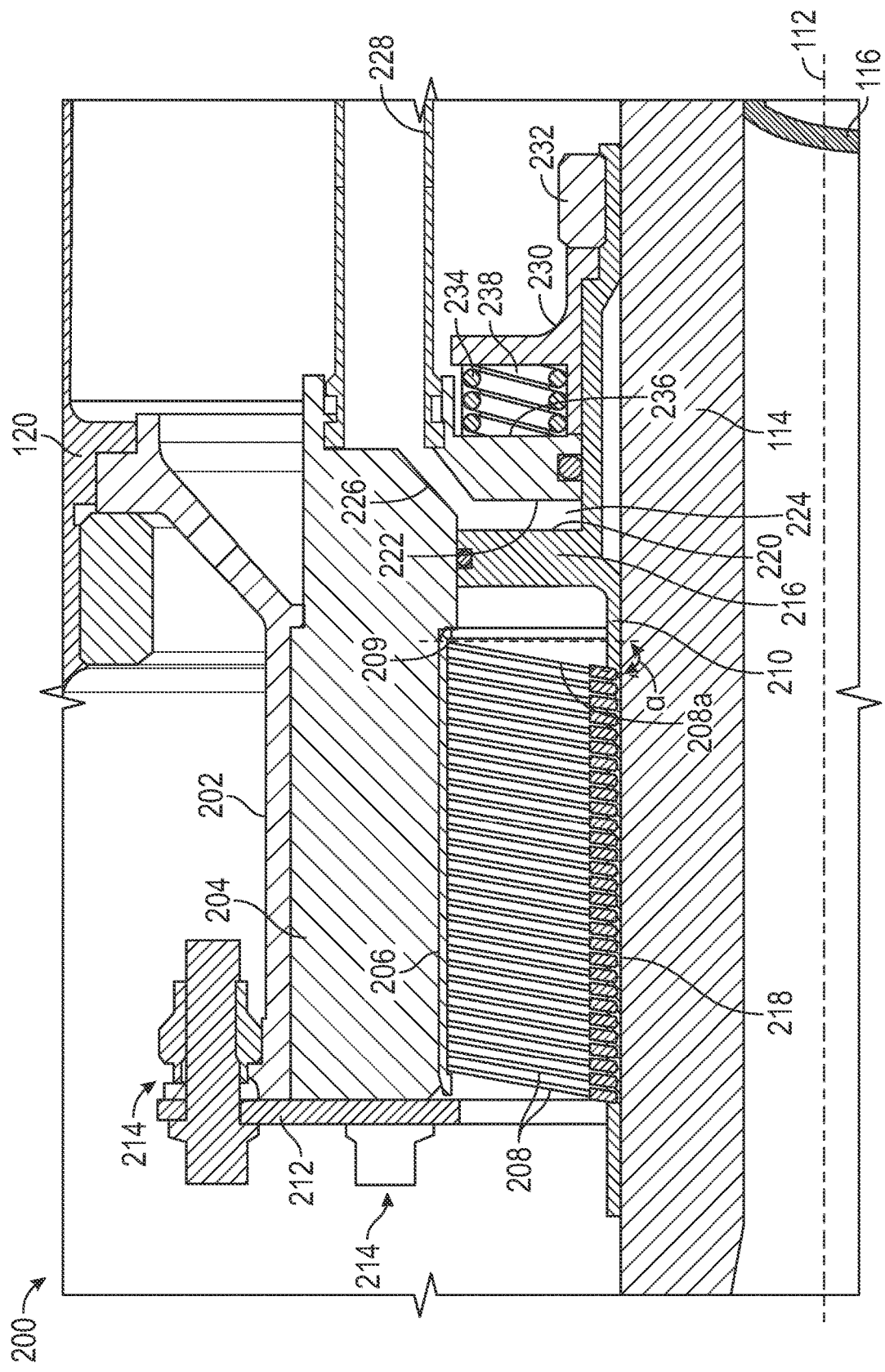
FIG. 6 illustrates a schematic, partial cross-sectional view of a pitch lock system of the hub assembly of FIG. 3, according to the present disclosure.
Figure 7:
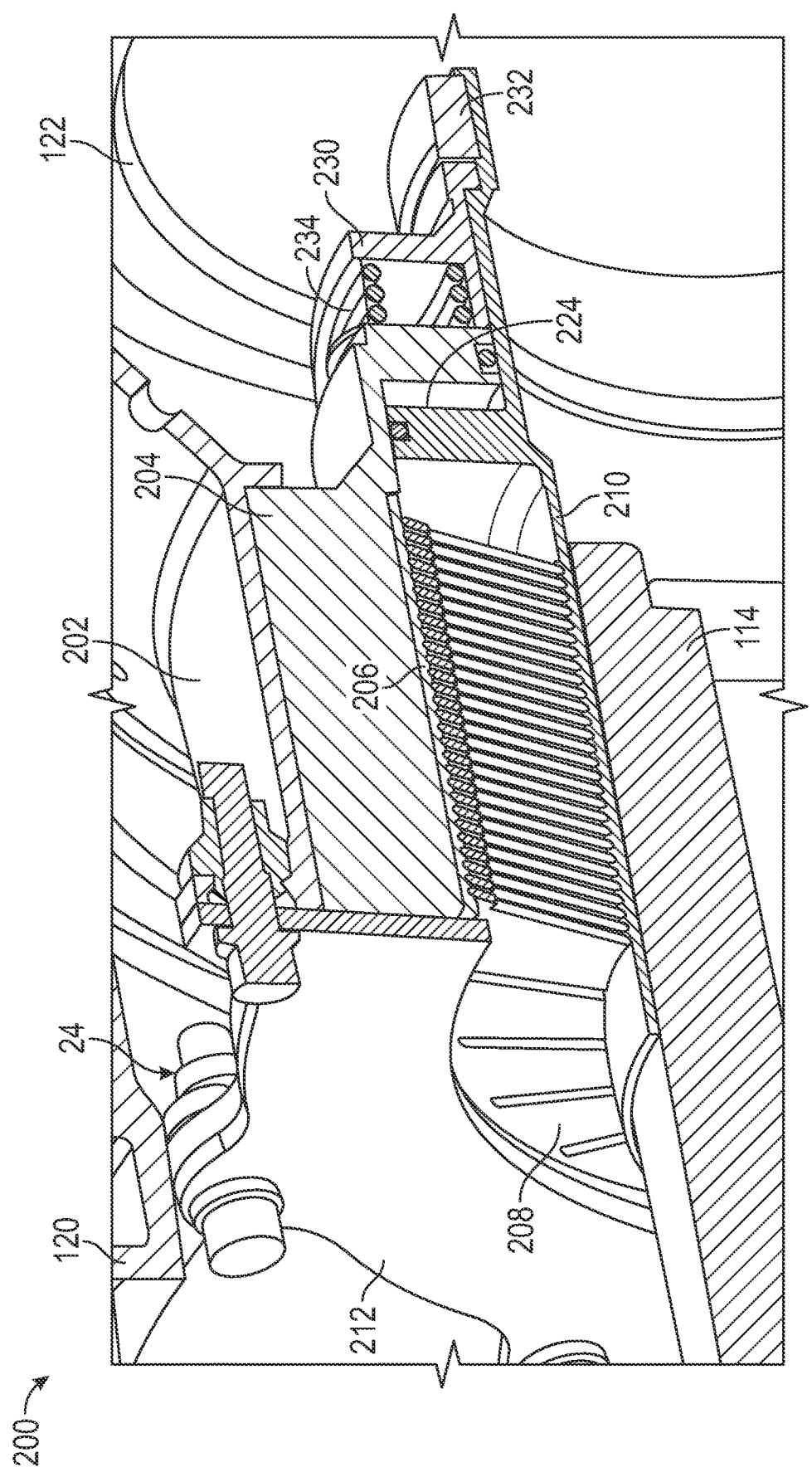
FIG. 7 illustrates a schematic, partial perspective cross-sectional view of the pitch lock system of FIG. 6, according to the present disclosure.
Figure 8:
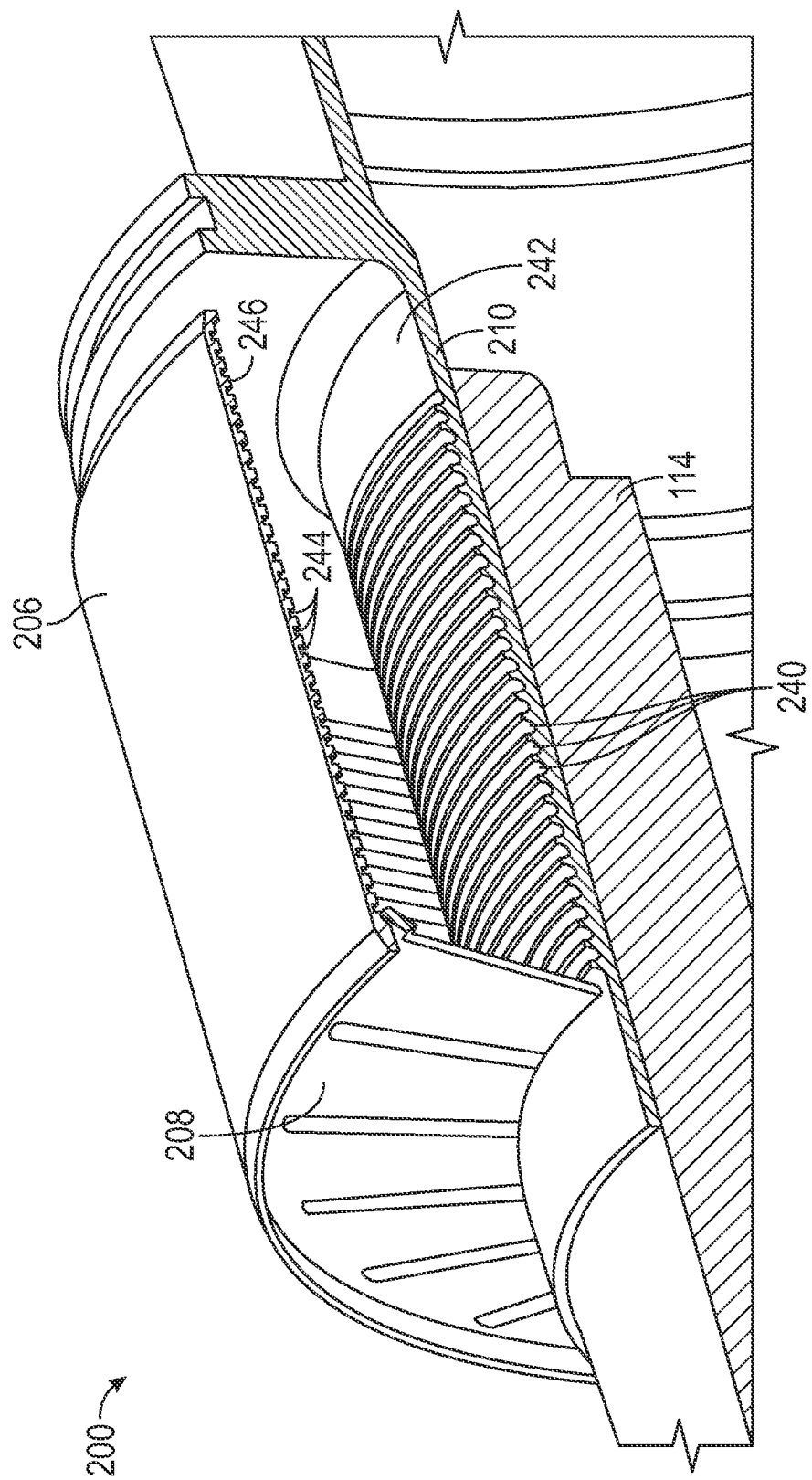
FIG. 8 illustrates a schematic, partial perspective cross-sectional view of the pitch lock system of FIG. 6, according to the present disclosure.
Figure 9B:
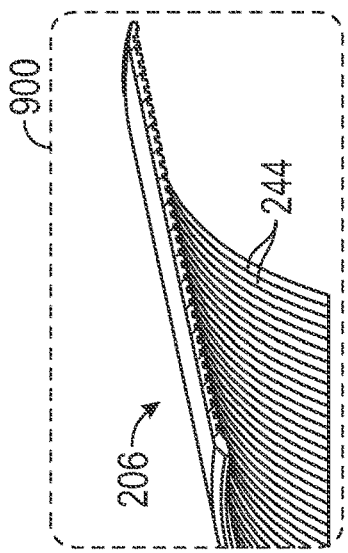
FIG. 9B illustrates a detailed view of the outer sleeve of FIG. 9A, according to the present disclosure.
Figure 9A:
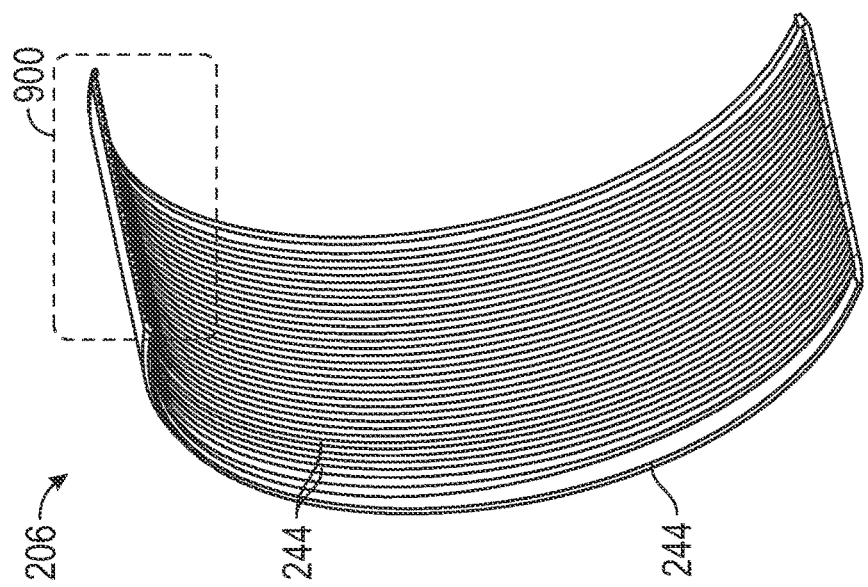
FIG. 9A illustrates a schematic, partial perspective cross-sectional view of an outer sleeve of the pitch lock system of FIG. 6, according to the present disclosure.

FIGS. 6 to 14B illustrate the pitch lock system 200 in more detail. FIGS. 6 and 7 illustrate a portion of the pitch lock system 200. The pitch lock system 200 is located radially between the inner shaft 114 and the piston 120. A static support 202 is fixed to the piston 120. A case 204, an outer sleeve 206, one or more clutch plates 208, also referred to as clutch elements 208, and an inner sleeve 210 are each located radially inward of the static support 202. An end plate 212 is coupled to the static support 202 with one or more fastening assemblies 214.

With continued reference to FIGS. 6 and 7, the inner sleeve 210, also referred to as an inner member 210, includes an inner sleeve piston 216 that protrudes radially outward from a grooved portion 218 of the inner sleeve 210. An aft surface 220 of the inner sleeve piston 216 and a forward surface 222 of the case 204 defines the space 224 described with respect to FIG. 5. As described previously, a passage 226 in the case 204 and a conduit 228 are fluidly coupled to the space 224. Together, the passage 226, the conduit 228, and the space 224 form a portion of the third chamber 152. A lock nut 232 is located around the inner sleeve 210 to prevent axial movement of a distal sleeve 230 in the aft direction. A biasing member 234 is constrained between an aft surface 236 of the case 204 and a forward surface 238 of the distal sleeve 230. The case 204 and the outer sleeve 206 together form an outer member. Each clutch plate 208 of the one or more clutch plates 208 is provided at an angle α. The angle α is defined between an aft surface 208a of the clutch plate 208 and an axis 209 normal to the centerline axis 112.

Figure 10A:
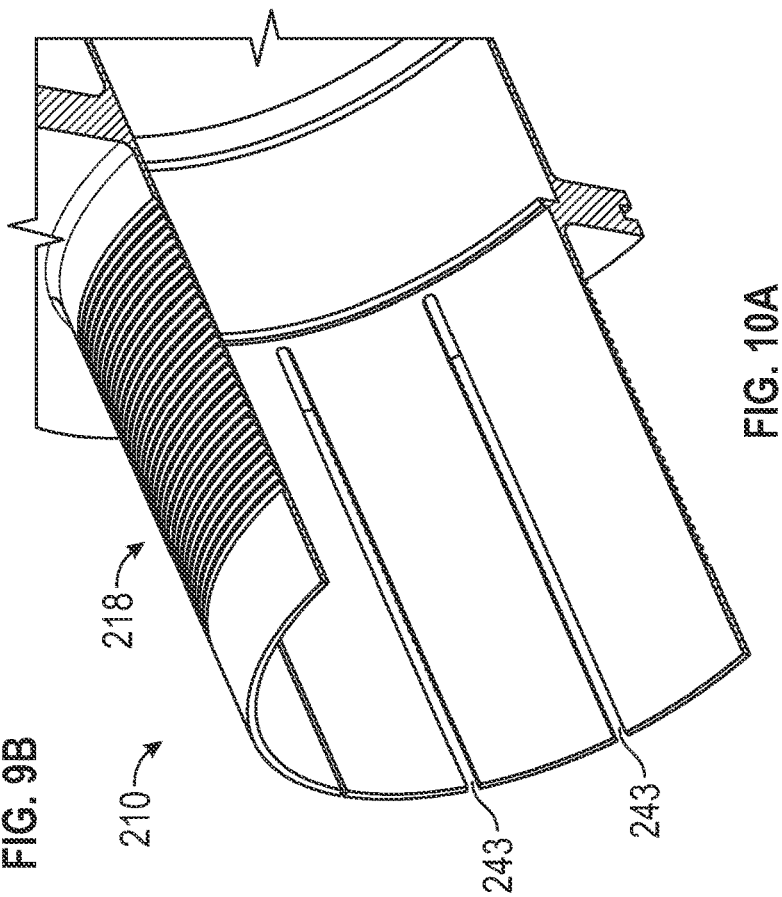
FIG. 10A illustrates a schematic, partial perspective cross-sectional view of an inner sleeve of the pitch lock system of FIG. 6, according to the present disclosure.
Figure 10B:
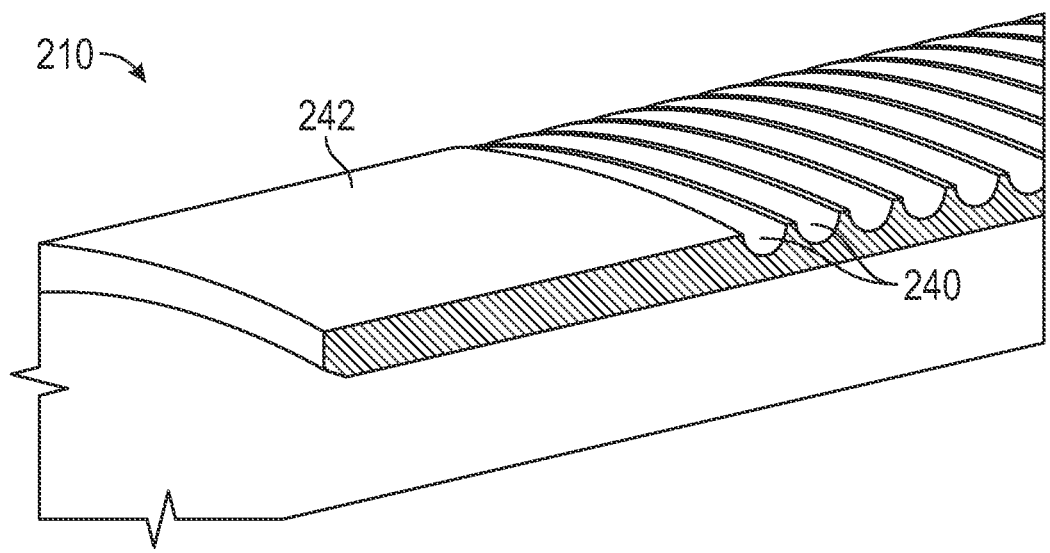
FIG. 10B illustrates a schematic, partial perspective cross-sectional view of the inner sleeve of FIG. 10A, according to the present disclosure.

FIGS. 8 to 10B illustrate the inner sleeve 210 and the outer sleeve 206 of the pitch lock system 200. A single clutch plate 208 is illustrated for clarity, however, additional clutch plates may be provided, such as shown in FIG. 7. As shown in the detail 900 of FIGS. 9A and 9B, the outer sleeve 206 has one or more outer sleeve grooves 244 provided on a radially inner surface 246 of the outer sleeve 206. As shown in FIGS. 10A and 10B, the inner sleeve 210 has one or more inner sleeve grooves 240 provided on a radially outer surface 242 of the inner sleeve 210. The inner sleeve 210 includes one or more axial slots 243 extending into the grooved portion 218 of the inner sleeve 210. Referring back to FIG. 8, each clutch plate 208 is aligned with one of the inner sleeve grooves 240 and one of the outer sleeve grooves 244 such that the clutch plate 208 is received within the inner sleeve 210 and the outer sleeve 206.

Figure 11:
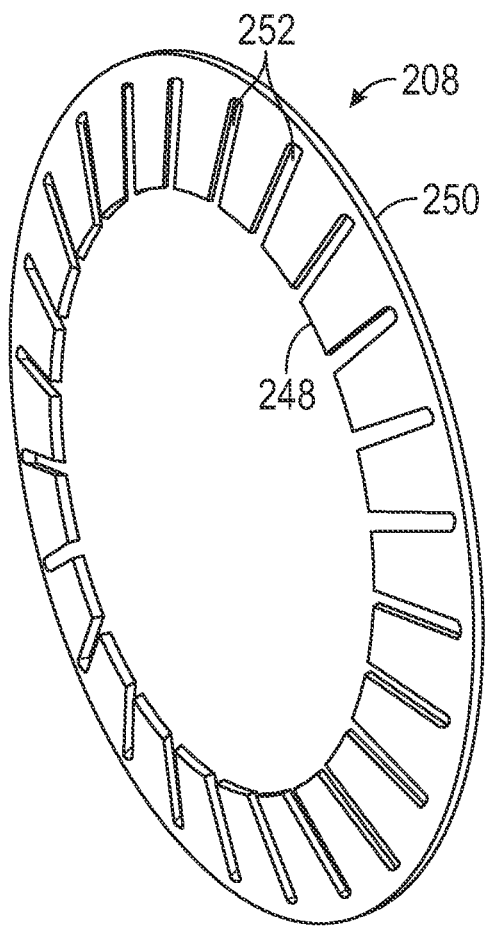
FIG. 11 illustrates a schematic, partial perspective view of a clutch plate of the pitch lock system of FIG. 6, according to the present disclosure.

FIG. 11 illustrates a perspective view of the clutch plate 208. The clutch plate 208 is annular such that the clutch plate 208 may be provided around the inner sleeve 210. An inner surface 248 of the clutch plate 208 engages the inner sleeve groove 240 of the inner sleeve 210. An outer surface 250 of the clutch plate 208 engages the outer sleeve groove 244 of the outer sleeve 206. A plurality of cutouts 252 are provided in the clutch plate 208 to allow for relative axial movement of the clutch plate 208 as will be described in more detail to follow.

During engine operation, the third chamber 152 is in an initial condition that is pressurized. That is, fluid is provided in the third chamber 152 and fluid is provided in the first conduit 154, the passage 156, the passage 226, and the conduit 228, collectively referred to as a pitch lock line 229. When there is a hydraulic failure as described previously, it is desired to lock the inner shaft 114 such that movement of the blades in the aft direction or fine direction is not permitted. This is accomplished automatically upon occurrence of the hydraulic failure, due to the third chamber 152 having the same fluid source as the coarse and fine chambers. Thus, when the pitch actuator experiences loss in pressure, so too will the pitch lock system 200, which will then activate. For example, and referring to FIGS. 6 to 11, when a failure, the third chamber 152 and the pitch lock line 229 become depressurized due to pressure drop in the oil (e.g., supply to the third chamber 152 and the pitch lock line 229 ceases).

The biasing member 234 (FIG. 7), is preloaded such that, in an initial condition, e.g., with normal operation of the pitch actuator (e.g., when the third chamber 152 is pressurized), the biasing member 234 provides a force in the forward direction on the aft surface 236 of the case 204. Once the pressure in the third chamber 152 drops in response to the hydraulic failure, the preloaded force on the aft surface 236 causes the distal sleeve 230, the lock nut 232, and the inner sleeve 210 to move in the axial direction A in the aft direction with respect to the case 204. The movement of the inner sleeve 210 in the aft direction also causes the one or more clutch plates 208 to move axially in the aft direction. Because the one or more clutch plates 208 are radially constrained between the inner sleeve 210 and the outer sleeve 206, movement of the inner sleeve 210 causes only a lower portion of the one or more clutch plates 208 (coupled to the inner sleeve 210) to move in the aft direction, while an upper portion of the plates (coupled to outer sleeve 206) remains fixed. This causes an angle of the plates with respect to a direction normal to the centerline axis 112 (e.g., the radial direction R shown in FIG. 1) to change when the pitch lock system 200 is activated.

The movement of the one or more clutch plates 208 is shown in FIGS. 12A to 14B. In FIGS. 12A and 12B, the pitch lock system 200 is in a disengaged position 1200. This is the initial condition of the pitch lock system 200 when the pitch actuator is operated properly and the hydraulic linear actuator is properly pressurized. In FIGS. 13A and 13B, the pitch lock system 200 is in a first engaged position 1300 and the CTM is equal to zero. In FIGS. 14A and 14B, the pitch lock system 200 is in a second engaged position 1400 and the CTM is at a maximum.

In the disengaged position of the pitch lock system 200 (e.g., FIGS. 12A and 12B), a gap 211 exists between the inner sleeve 210 and the inner shaft 114. The gap 211 allows movement of the inner shaft 114 relative to the pitch lock system 200 in the forward/coarse direction and in the aft/fine direction to effectuate pitch changed of the blades, as described previously. In the engaged position of the pitch lock system 200 (see, e.g., FIGS. 13A to 14B), the gap 211 is closed. This is due to the angle α (FIG. 6) of the one or more clutch plates 208 decreasing when the pitch lock system 200 is engaged. When the pressure in the third chamber 152 is reduced, the biasing member 234 moves the case 204 in the axially forward direction, which in turn also moves the top portion of the one or more clutch plates 208 in the axially forward direction. The axial movement of the one or more clutch plates 208 causes the angle α to decrease.

As the angle α decreases, the one or more clutch plates 208 are oriented more vertically with respect to the axis 209. From the disengaged position 1200 to the first engaged position 1300, this causes the gap 211 to close. That is, the more vertical clutch plates 208 in the first engaged position 1300 as compared to the disengaged position 1200 cause the inner sleeve 210 to move radially inward toward the inner shaft 114, thus closing the gap 211. A force $F_1$ is beginning to be initiated by the one or more clutch plates 208. As pressure continues to drop in the third chamber 152, the biasing member 234 continues to move the case 204 in the axially forward direction, thus, further moving the top portion of the one or more clutch plates 208 in the axially forward direction. This causes the pitch lock system 200 to move from the first engaged position 1300 to the second engaged position 1400. The one or more clutch plates 208 are now more vertical than in the first engaged position 1300 and a force $F_2$ exerted on the case 204 and the inner sleeve 210 is greater than in the first engaged position 1300. The friction force $F_1$ and the friction force $F_2$ prevent motion of the inner shaft 114 in the aft direction.

Because the one or more clutch plates 208 are angled toward the forward direction from a top of the clutch plate 208 to the bottom of the clutch plate 208, motion of the inner shaft 114 in the forward direction is still permitted. That is, if the inner shaft 114 is moved forward to cause the blades to effectuate the coarse pitch of the plates, the angle $\alpha$ increases reducing the friction force and allowing motion. However, when the inner shaft 114 again moves aft, the angle $\alpha$ decreases to the first engaged position 1300 and then the second engaged position 1400 and further movement in the aft direction is prohibited.

The angle $\alpha_1$ of the disengaged position 1200 is greater than each of the angle $\alpha_2$ in the first engaged position 1300 and the angle $\alpha_3$ in the second engaged position 1400. The angle of each of the one or more clutch plates 208 with respect to the axis 209 is constrained at the upper limit by the angle of friction determined by the coefficient of friction of the inner sleeve 210, the inner shaft 114, and between the inner sleeve 210 and the inner shaft 114. The angle of each of the one or more clutch plates 208 with respect to the axis 209 is constrained at the lower limit by zero. That is, the clutch plates 208 may not have a negative angle such that the clutch plates 208 are angled on the opposing side of the axis 209. The angle $\alpha_1$, $\alpha_2$, and $\alpha_3$ may be between zero and thirty degrees. In one example, the angle $\alpha_1$ may be 13.1 degrees, the angle $\alpha_2$ may be 11.3 degrees and the angle $\alpha_3$ may be 5.7 degrees.

When the third chamber 152 and the pitch lock line 229 are again pressurized (e.g., the hydraulic failure has been corrected), the pitch lock system 200 returns to the disengaged position and relative motion of the inner shaft 114 in the forward direction and in the aft direction is permitted.

Accordingly, the pitch lock system 200 provides the ability to prevent or to prohibit motion of the inner shaft 114 in the fine direction, or aft direction, thus preventing the fan blades from rotating toward a fine pitch.

Figure 15:
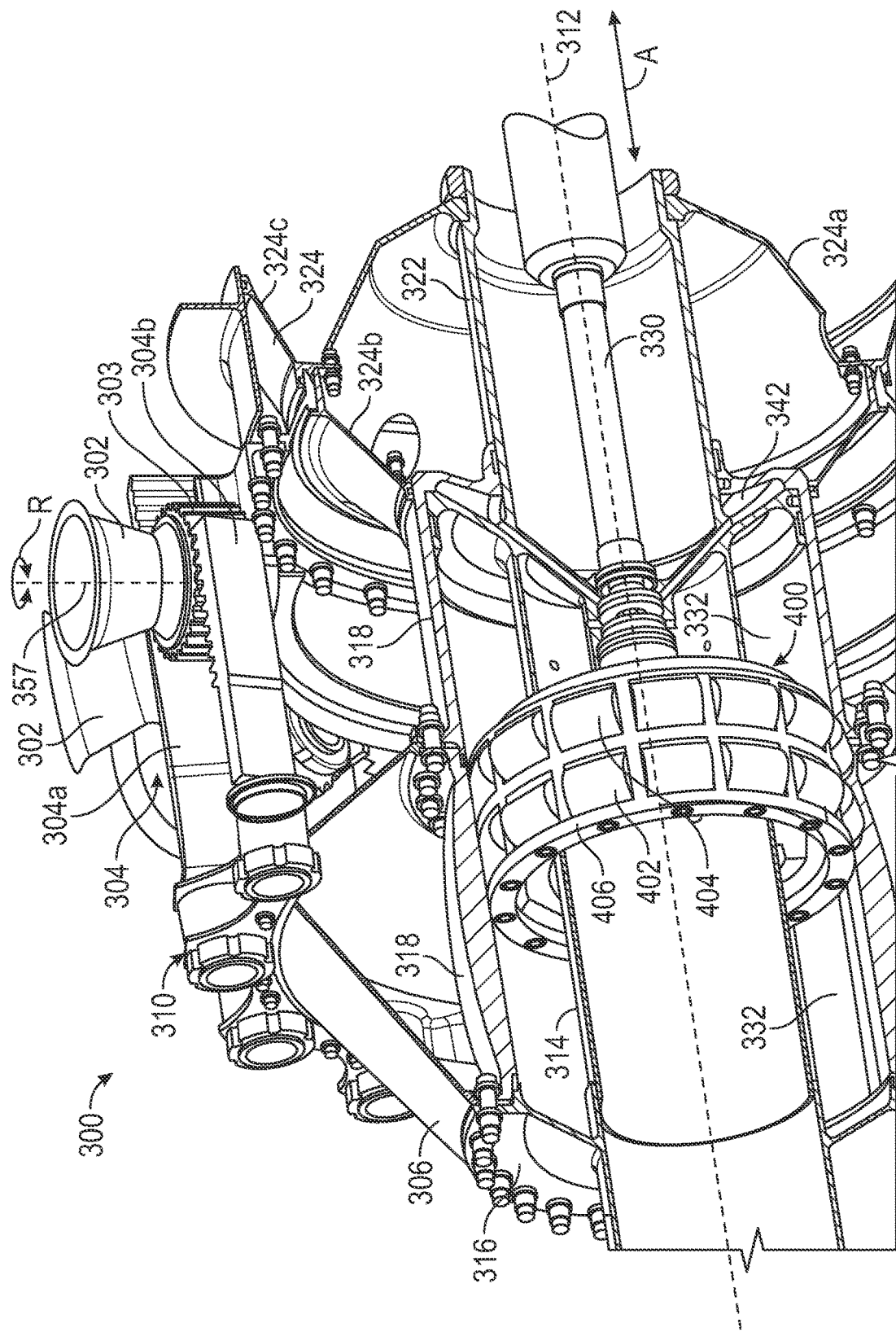
FIG. 15 illustrates a schematic, perspective cross-sectional view of a hub assembly, taken along a centerline axis, according to the present disclosure.
Figure 16:
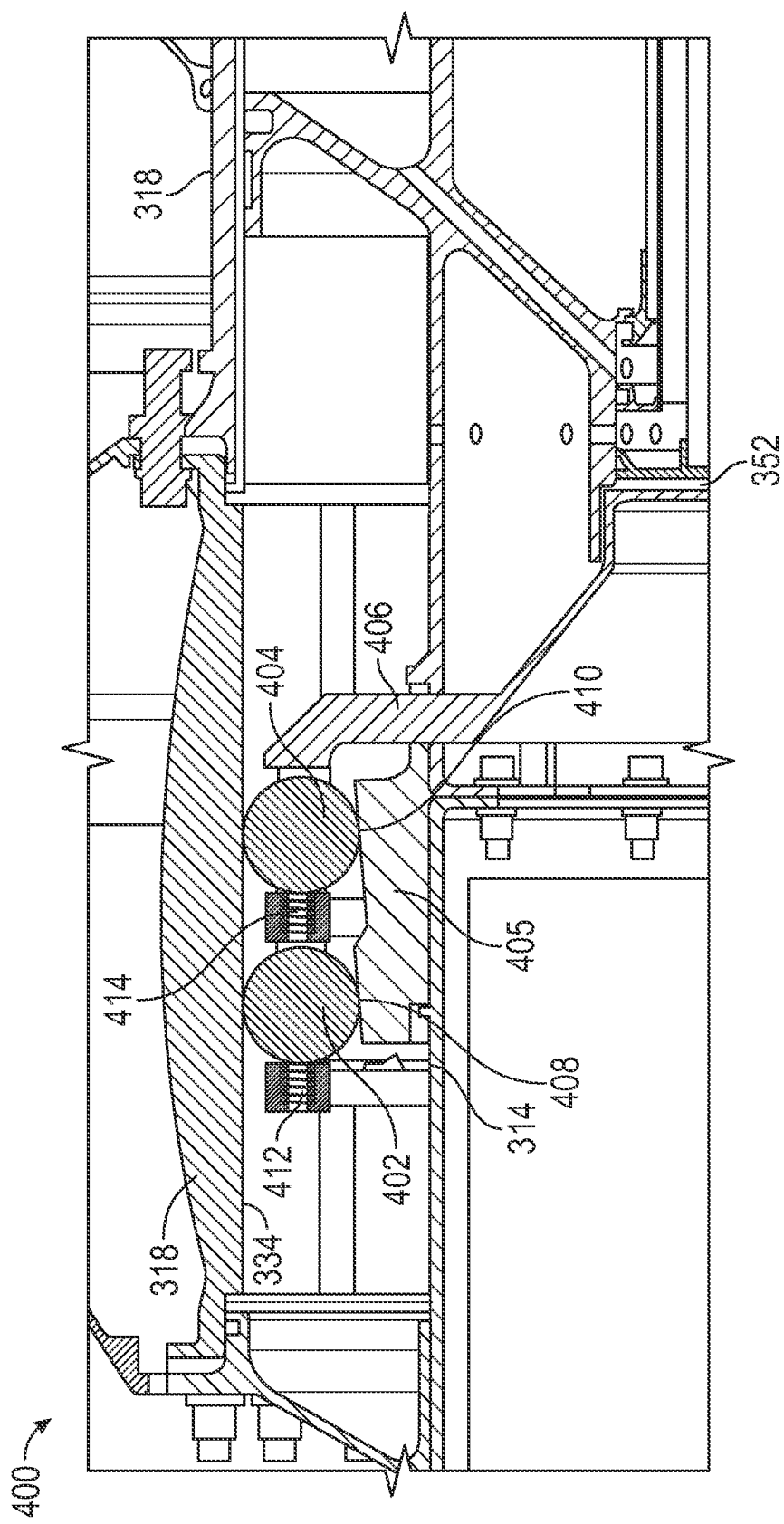
FIG. 16 illustrates a schematic, cross-sectional view of a pitch lock system of the hub assembly of FIG. 15, according to the present disclosure.
Figure 17:
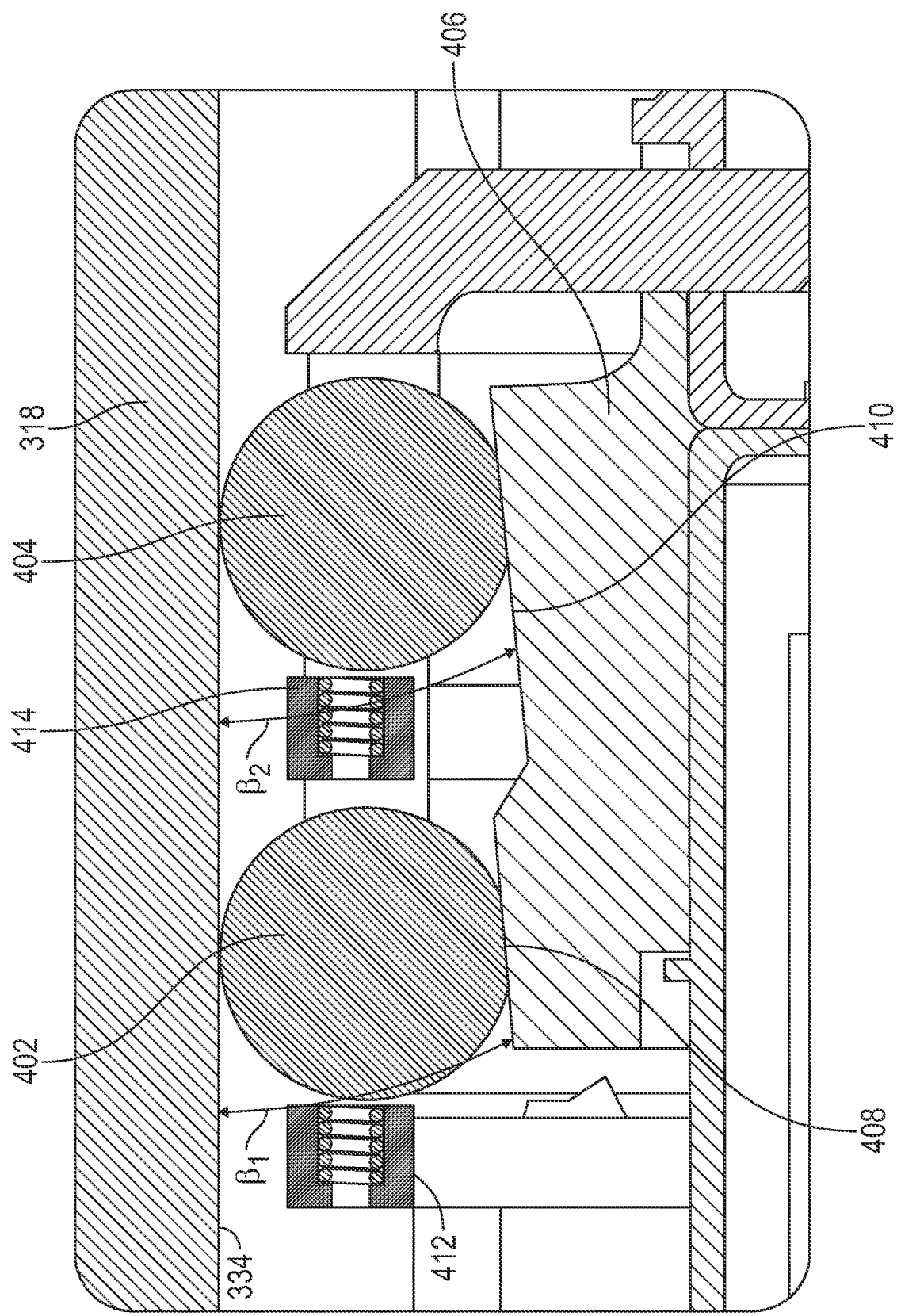
FIG. 17 illustrates a schematic, cross-sectional view of a pitch lock system of the hub assembly of FIG. 15, according to the present disclosure.
Figure 18:
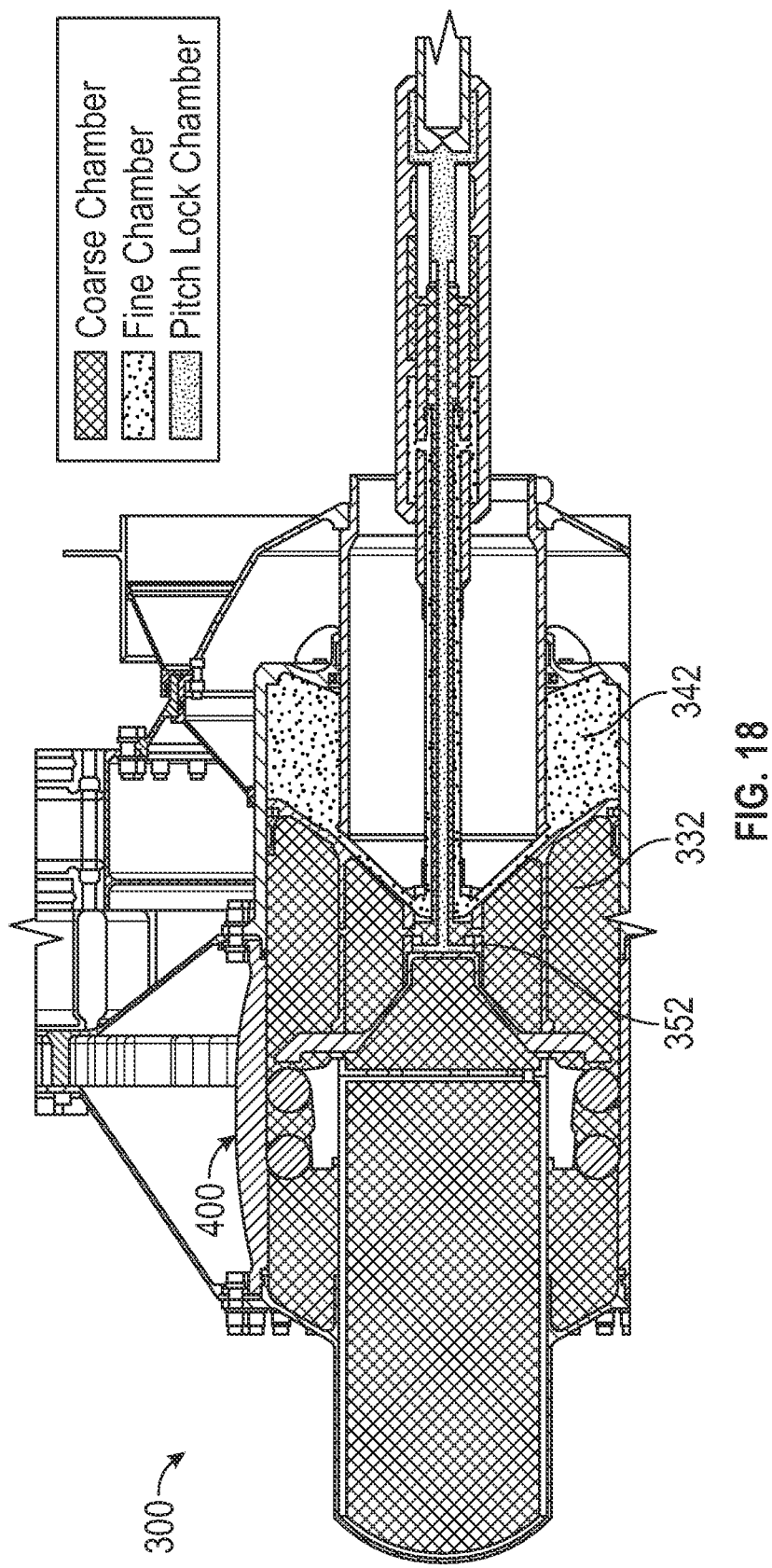
FIG. 18 illustrates a schematic, cross-sectional view of the hub assembly of FIG. 15 with fluid illustrated in chambers of the hub assembly, according to the present disclosure.

FIGS. 15 to 18 illustrate perspective views of a hub assembly 300 that may be used in the gas turbine engine 10 shown in FIG. 1. That is, the hub assembly 300 may be used in place of the hub assembly 53 shown in FIG. 1 to control the pitch of the fan blades 54 shown in FIG. 1. FIG. 16 illustrates a partial cross-sectional view of the hub assembly 300 taken along the centerline axis 312 in FIG. 15. FIG. 17 illustrates an enlarged view of a portion of FIG. 16. FIG. 18 illustrates another cross-sectional view of the hub assembly 300. The hub assembly 300 and the hub assembly 100 each shows a different pitch actuator for changing the pitch of the blades. The pitch lock system shown in FIGS. 15 to 18 may however, be employed with the hub assembly 100 (in lieu of the pitch lock system 200) and vice versa.

Referring to FIG. 15, the hub assembly 300 includes a plurality of trunnions 302 for coupling to a respective blade (omitted from FIG. 15 for clarity, although this may be the fan blade 54 shown in FIG. 1). Each trunnion 302 is coupled by a link 304 to a flange 306. In operation, as will be described in more detail to follow, movement of the flange 306 in the axial direction A along the centerline axis 312 moves the plurality of links 304 in the axial direction A to rotate each of the trunnions 302 a direction R about a central blade axis 357 of each blade. Each link 304 includes a rack locknut 310, a first rack 304a, a second rack 304b, and a pinion 303.

The hub assembly 300 includes an inner shaft 314, a plug 316, and cylinder 318, all fixedly coupled to the flange 306. Although shown coupled with bolts, other connections are contemplated, including a unitary construction with flange 306. The cylinder 318 extends circumferentially around, with respect to the centerline axis 312, and outer surface of a pitch lock system 400. As will be described in more detail to follow, the cylinder 318 is an outer race of the pitch lock system 400 and forms an outer member of the pitch lock system 400. A piston 322 is coupled to the cylinder 318. An oil sleeve 324 formed of a first portion 324a, a second portion 324b, and a third portion 324c is located circumferentially around an outer surface of the piston 322. Located within the piston 322 is an oil transfer tube 330.

Referring briefly to FIGS. 15 and 18, the hub assembly 300 forms a number of chambers to allow control of the pitch of the blades (e.g., the fan blades 54 in FIG. 1). A first chamber 332, a second chamber 342, and a third chamber 352 (FIGS. 16 and 18). The first chamber 332 is also referred to herein as a coarse chamber 332 or a feather chamber 332. The second chamber 342 is also referred to as a fine chamber 342. The third chamber 352 is also referred to as an on/off switch chamber 352.

The hub assembly 300 is controlled to alter a pitch of a blade (e.g., the fan blade 54 of FIG. 1) about the central blade axis 357 (e.g., the central blade axis 57 of FIG. 1). During operation, fluid may be supplied to or removed from either the first chamber 332 or the second chamber 342 to affect movement in the axial direction A. For example, when fluid is supplied to the first chamber 332, the cylinder 318, the plug 316, and the flange 306 move in the forward direction along the axial direction A away from the inner shaft 314, the piston 322, and the pitch lock system 400, which move in the aft direction along the axial direction A. This movement causes movement of the second rack 304b in a forward direction and movement of the first rack 304a in the aft direction (due to the interaction with the pinion 303) to rotate the trunnion 302. Thus, when the second rack 304b moves in the forward direction, the trunnions 302 rotate in the direction R such that the blades have a coarse pitch. When fluid is supplied to the second chamber 342, the cylinder 318, the plug 316, and the flange 306 move in the aft direction along the axial direction A toward the inner shaft 314, the piston 322, and the pitch lock system 400, which move in the forward direction along the axial direction A. This movement causes movement of the second rack 304b in an aft direction and movement of the first rack 304a in the forward direction (due to the interaction with the pinion 303) to rotate the trunnion 302 in the opposition direction of rotation as the coarse motion. Thus, when the second rack 304b moves in the aft direction, the trunnions 302 rotate in the direction R such that the blades have a fine pitch. The aforementioned assembly is also referred to herein as a pitch actuator as this is the system that effectuates change of the pitch of the fan blades.

The hub assembly 300 is formed in a manner that allows the transition from coarse to fine to be repeatable multiple times. Through this system, a predetermined pitch or a desired pitch of the blades may be achieved through control of the fluid to the first chamber 332 and the second chamber 342.

As mentioned with respect to the hub assembly 100, due to the CTM of the blades acting on the central blade axis 357, the hub assembly 300 tends to pull to the fine position. That is, the moment caused by the CTM of the blades acts toward the aft direction to move the cylinder 318, the plug 316, and the flange 306 toward the aft direction. Thus, if there is a hydraulic failure in the pitch actuator, the blades will move to the fine position. In order to prevent this undesired movement to the fine position, the pitch lock system 400 is provided. The pitch lock system 400 activates automatically when a hydraulic failure occurs in the pitch actuator to prevent the blades from moving more toward the fine position than the position of the blade when the hydraulic failure occurs.

Referring to FIGS. 15 and 16, the pitch lock system 400 includes a first row of roller elements 402 and a second row of roller elements 404 held within a cage 406. The roller elements 402 and the roller elements 404 are also referred to herein as clutch elements. An inner surface 334 of the cylinder 318 acts as an outer race for the roller elements 402 and the roller elements 404. An inner race 405 is provided on the inner shaft 314. The inner race 405 is also referred to as an inner member 405, and includes a first angled surface 408 and a second angled surface 410. The first row of roller elements 402 is constrained between the first angled surface 408 and the inner surface 334 of the cylinder 318. The second row of roller elements 404 is constrained between the second angled surface 410 and the inner surface 334 of the cylinder 318. The first angled surface 408 and the second angled surface 410 form ramps for the roller elements 402 and the roller elements 404, respectively. A first biasing member 412 acts upon the first row of roller elements 402 and a second biasing member 414 acts upon the second row of roller elements 404.

During engine operation, the third chamber 352 is in an initial condition that is pressurized. When there is a hydraulic failure as described previously, it is desired to lock aft movement of the hub assembly 300 such that movement of the blades in the aft direction or the fine direction is not permitted. This is accomplished automatically upon occurrence of the hydraulic failure, due to the third chamber 352 having the same fluid source as the coarse chamber and the fine chamber. For example, and referring to FIGS. 15 to 18, when a hydraulic failure occurs, the third chamber 352 and the pitch lock line become depressurized due to pressure drop in the oil (e.g., supply to the third chamber 352 and the pitch lock line ceases).

The first biasing member 412 and the second biasing member 414 are preloaded such that in an initial condition, e.g., with a normal operation of the pitch actuator (e.g., when the third chamber 352 is pressurized), the biasing members are compressed between the roller elements and the cage 406. Once the pressure in the third chamber 352 drops in response to the hydraulic failure, the preloaded force of the basing members causes the roller elements to move aft, up the angled surfaces 408, 410, to be compressed between the biasing members and the cage 406. A gap (not shown) exists between the roller elements 402, 404 and the inner surface 334 when the pitch lock system 400 is disengaged. The movement of the roller elements 402, 404 aft and radially outward causes the roller elements 402, 404 to close the gap and become constrained between the inner surface 334 of the cylinder 318 and the inner race 405. The biasing members 412, 414 maintain the roller elements 402, 404 in this constrained condition. This prevents motion of the inner shaft 314 and attached parts in the aft direction to the fine pitch position.

Referring to FIG. 17, an angle $\beta_1$ exists between the inner surface 334 of the cylinder 318 and the first angled surface 408. An angle $\beta_2$ exists between the inner surface 334 of the cylinder 318 and the angled surface 410. The angles $\beta_1$ and $\beta_2$ are constrained at the upper limit by the angle of friction determined by the coefficient of friction of the angled surface 408 (for angle $\beta_1$), the second angled surface 410 (for angle $\beta_2$), the inner surface 334, between the first angled surface 408 and the inner surface 334 (for angle $\beta_1$), and between the second angled surface 410 and the inner surface 334 (for angle $\beta_2$). The angle $\beta_1$ and $\beta_2$ may be between zero and thirty degrees. Although a first row of roller elements 402 and a second row of roller elements 404 are described, only a single row may be provided, and, thus, a single angled surface and a single biasing member provided. In some examples, more than two rows of roller elements, biasing members, and angled surfaces are provided.

Accordingly, the aforementioned pitch lock system 200 and the pitch lock system 400 provide a one-way clutch to prevent relative axial motion in a single direction, while allowing relative axial motion in the opposing direction. Although the pitch lock systems of the present disclosure are disclosed to prevent axial motion in the aft direction, the pitch lock system may be oriented such that axial motion in the forward direction is prevented. That is, for example, the angle of the clutch plates and the angled surfaces may be reversed to provide a one-way clutch in the opposite direction.

The fluid for the first chamber, the second chamber, and the third chamber described herein may be oil. The source of the oil may be the same for each of the first chamber, the second chamber, and the third chamber. The biasing members described herein may be springs, such as compression springs, or other known biasing members, including, but not limited to torsional springs, shape memory alloys, etc. Although a single biasing member is shown, more than one biasing member may be provided circumferentially around the centerline axis.

The aforementioned pitch lock systems are described as being activated upon hydraulic failure, that is, loss of hydraulic pressure, to the pitch actuator (e.g., to any one or more of the coarse and fine chambers). In some examples, the pitch lock system may also be activated upon any detection of an inability of the pitch actuator to maintain the fan blades at the predetermined pitch.

Therefore, the present disclosure provides a one-way linear pitch lock system. The pitch lock system may include a one-way linear clutch capable to mechanically ensure pitch lock of the fan blades. That is, the clutch plates and the roller elements form a one-way linear clutch. When the pitch actuator is operating normally, the pitch lock system is disengaged, the chamber is pressurized, and the springs are energized. When the pressure is lost in the chamber, the pitch lock system engages. The system accommodates continuous axial movements in both axially forward and axially aft directions until the pitch lock system is engaged. The system relies on elements (clutch plates or roller elements) that are wedged between two members to prevent axially aft movement of the pitch system and, thus, to pitch lock the fan blades.

Furthermore, the pitch lock systems of the present disclosure provide a reliable system with a low part count, a lightweight system, a system layout that allows efficient and easy replacement of the pitch lock system and elements thereof, clutch elements capable of both being back driven by the inner member and structurally adequate for reacting to blade loads, and a mechanical clutch that may be applied also to other pitch actuators such as those with links, yoke and pins, etc.

Further aspects are provided by the subject matter of the following clauses.

A pitch lock system includes an outer member having a centerline axis, an inner member located radially inward of the outer member with respect to the centerline axis, and a plurality of clutch elements located between the outer member and the inner member, the pitch lock system having a disengaged position and an engaged position, and, in the engaged position, the plurality of clutch elements are constrained between the inner member and the outer member such that relative axial direction of the plurality of clutch elements is permitted in only one direction.

The pitch lock system of the preceding clause, further including a biasing member configured to bias the plurality of clutch elements to the engaged position.

The pitch lock system of any preceding clause, further including an on/off chamber that is pressurized in the disengaged position and depressurized in the engaged position.

The pitch lock system of any preceding clause, in the engaged position, the pitch lock system preventing movement of a pitch actuator in a fine direction and allows movement of the pitch actuator in a coarse direction, and, in the disengaged position, the pitch lock system allows movement of the pitch actuator in the fine direction and in the coarse direction.

The pitch lock system of any preceding clause, further including a gap in the pitch lock system, the gap being open in the disengaged position and closed in the engaged position.

The pitch lock system of any preceding clause, the plurality of clutch elements including a plurality of roller elements.

The pitch lock system of any preceding clause, the inner member including an angled surface for the plurality of roller elements.

The pitch lock system of any preceding clause, further including a gap between the plurality of clutch elements and the outer member, the gap being open in the disengaged position and closed in the engaged position.

The pitch lock system of any preceding clause, the plurality of clutch elements including a plurality of clutch plates.

The pitch lock system of any preceding clause, further including a gap between the inner member and a pitch actuator, the gap being open in the disengaged position and closed in the engaged position.

The pitch lock system of any preceding clause, the plurality of clutch elements being at an angle with respect to an axis normal to the centerline axis.

The pitch lock system of any preceding clause, the angle being greater in the disengaged position than in the engaged position.

The pitch lock system of any preceding clause, the inner member including an inner sleeve having a plurality of grooves.

The pitch lock system of any preceding clause, the outer member including an outer sleeve having a plurality of grooves.

The pitch lock system of any preceding clause, the plurality of clutch elements being constrained within a plurality of grooves on the inner member and the outer member.

The pitch lock system of any preceding clause, the outer member including a case extending circumferentially around the plurality of clutch elements.

The pitch lock system of the preceding clause, further including a biasing member, the biasing member being constrained between a distal sleeve and an aft surface of the case.

The pitch lock system of any preceding clause, further including an on/off chamber located between a forward surface of the case and a surface of the inner sleeve.

The pitch lock system of any preceding clause, further including a pitch lock line configured to supply the on/off chamber with pressurized fluid.

The pitch lock system of any preceding clause, the inner member being an inner race having an angled ramp surface.

The pitch lock system of any preceding clause, the plurality of clutch members including a first circumferential row of roller elements and a second circumferential row of roller elements.

The pitch lock system of any preceding clause, further including a gap between the plurality of clutch elements and the outer member.

The pitch lock system of any preceding clause, further including a cage configured to secure the plurality of clutch elements on the inner member.

An engine includes a hydraulic pitch actuator configured to change a pitch of a fan blade of the engine, and a mechanical pitch lock system including an outer member having a centerline axis, an inner member located radially inward of the outer member with respect to the centerline axis, and a plurality of clutch elements located between the outer member and the inner member, the mechanical pitch lock system having a disengaged position and an engaged position, and, in the engaged position, the plurality of clutch elements are constrained between the inner member and the outer member such that relative axial direction of the plurality of clutch elements is permitted in only one direction.

The engine of the preceding clause, further including a biasing member configured to bias the plurality of clutch elements to the engaged position.

The engine of any preceding clause, further including an on/off chamber that is pressurized in the disengaged position and depressurized in the engaged position.

The engine of any preceding clause, in the engaged position, the mechanical pitch lock system preventing movement of the hydraulic pitch actuator in a fine direction and allows movement of the hydraulic pitch actuator in a coarse direction, and, in the disengaged position, the mechanical pitch lock system allows movement of the hydraulic pitch actuator in the fine direction and in the coarse direction.

The engine of any preceding clause, the plurality of clutch elements being a plurality of clutch plates or a plurality of roller elements.

The engine of any preceding clause, further including a gap in the mechanical pitch lock system, the gap being open in the disengaged position and closed in the engaged position.

The engine of any preceding clause, the hydraulic pitch actuator including an inner shaft, and the gap is located between the inner shaft and the inner member.

The engine of any preceding clause, the gap being located between the plurality of clutch elements and the outer member.

The engine of any preceding clause, the pitch actuator further including a coarse chamber and a fine chamber, hydraulic failure to one of the coarse chamber or the fine chamber activating the pitch lock system.

The engine of any preceding clause, the inner member including an inner sleeve having a plurality of grooves.

The engine of any preceding clause, the outer member including an outer sleeve having a plurality of grooves.

The engine of any preceding clause, the plurality of clutch elements being constrained within a plurality of grooves on the inner member and the outer member.

The engine of any preceding clause, the outer member including a case extending circumferentially around the plurality of clutch elements.

The engine of the preceding clause, further including a biasing member, the biasing member being constrained between a distal sleeve and an aft surface of the case.

The engine of any preceding clause, further including an on/off chamber located between a forward surface of the case and a surface of the inner sleeve.

The engine of any preceding clause, further including a pitch lock line configured to supply the on/off chamber with pressurized fluid.

The engine of any preceding clause, the inner member being an inner race having an angled ramp surface.

The engine of any preceding clause, the plurality of clutch members including a first circumferential row of roller elements and a second circumferential row of roller elements.

The engine of any preceding clause, further including a gap between the plurality of clutch elements and the outer member.

The engine of any preceding clause, further including a cage configured to secure the plurality of clutch elements on the inner member.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A hub assembly comprising:
   a hydraulic pitch actuator configured to move in a first direction and a second direction opposite the first direction;
   a pitch lock system for preventing the hydraulic pitch actuator from moving in the first direction or the second direction, the pitch lock system comprising:
   an outer member having a centerline axis;
   an inner member located radially inward of the outer member with respect to the centerline axis;
   a plurality of clutch plates located between the outer member and the inner member; and
   wherein the pitch lock system has a disengaged position and an engaged position, and, in the engaged position, the relative axial direction of the plurality of clutch plates is permitted in only one direction and the inner member is forced radially inwards to prevent movement of the hydraulic pitch actuator in the first direction or the second direction.

2. The hub assembly of claim 1, further comprising a biasing member configured to bias the plurality of clutch plates to the engaged position.

3. The hub assembly of claim 1, further comprising an on/off chamber that is pressurized in the disengaged position and depressurized in the engaged position.

4. The hub assembly of claim 1, wherein, in the disengaged position, the pitch lock system allows movement of the hydraulic pitch actuator in an aft direction and in a forward direction.

5. The hub assembly of claim 1, further comprising a gap in the pitch lock system, wherein the gap is open in the disengaged position and closed in the engaged position.

6. The hub assembly of claim 1, further comprising a gap between the inner member and the hydraulic pitch actuator, wherein the gap is open in the disengaged position and closed in the engaged position.

7. The hub assembly of claim 1, wherein the plurality of clutch plates is at an angle with respect to an axis normal to the centerline axis.

8. The hub assembly of claim 7, wherein the angle is greater in the disengaged position than in the engaged position.

9. A turbine engine comprising:
   a core engine including a compressor section, a combustion section, and a turbine section in a serial flow relationship;
   a hub assembly comprising:
   a hydraulic pitch actuator configured to move in a first direction and a second direction opposite the first direction; and
   a pitch lock system for preventing the hydraulic pitch actuator from moving in the first direction or the second direction, the pitch lock system including:
   an outer member having a centerline axis;
   an inner member located radially inward of the outer member with respect to the centerline axis;
   a plurality of clutch plates located between the outer member and the inner member; and
   wherein, the pitch lock system has a disengaged position and an engaged position, and, in the engaged position, the relative axial direction of the plurality of clutch plates is permitted in only one direction such that the inner member is forced radially inwards to prevent movement of the hydraulic pitch actuator in the first direction or the second direction.

10. The turbine engine of claim 9, further comprising a biasing member configured to bias the plurality of clutch plates to the engaged position.

11. The turbine engine of claim 9, further comprising an on/off chamber that is pressurized in the disengaged position and depressurized in the engaged position.

12. The turbine engine of claim 9, wherein, in the disengaged position, the pitch lock system allows movement of the hydraulic pitch actuator in an aft direction and in a forward direction.

13. The turbine engine of claim 9, further comprising a gap in the pitch lock system, wherein the gap is open in the disengaged position and closed in the engaged position.

14. The turbine engine of claim 13, wherein the hydraulic pitch actuator comprises an inner shaft, and the gap is located between the inner shaft and the inner member.

15. The hub assembly of claim 1, wherein the inner member includes an inner sleeve having a plurality of grooves.

16. The hub assembly of claim 1, wherein the outer member includes an outer sleeve have a plurality of grooves.

17. The hub assembly of claim 1, wherein the outer member includes a case extending circumferentially around the plurality of clutch plates.

18. The turbine engine of claim 9, wherein the inner member includes an inner sleeve having a plurality of grooves.

19. The turbine engine of claim 9, wherein the outer member includes an outer sleeve have a plurality of grooves.

* * * * *